United States Patent
Hirose

(10) Patent No.: US 9,653,097 B2
(45) Date of Patent: May 16, 2017

(54) SOUND OUTPUT DEVICE, NETWORK SYSTEM, AND SOUND OUTPUT METHOD

(71) Applicant: SHARP KABUSHIKI KAISHA, Osaka-shi, Osaka (JP)

(72) Inventor: Hitoshi Hirose, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/820,688

(22) Filed: Aug. 7, 2015

(65) Prior Publication Data

US 2016/0042749 A1 Feb. 11, 2016

(30) Foreign Application Priority Data

Aug. 7, 2014 (JP) .................................. 2014-161376

(51) Int. Cl.
*G10L 21/00* (2013.01)
*G10L 25/63* (2013.01)
*G10L 15/22* (2006.01)

(52) U.S. Cl.
CPC .............. *G10L 25/63* (2013.01); *G10L 15/22* (2013.01); *G10L 2015/227* (2013.01)

(58) Field of Classification Search
CPC ......... G10L 25/63; G10L 15/22; G10L 13/10; G10L 15/1822; G06F 17/30746; G06F 2203/011; G06F 3/167
USPC ....... 704/270, 276, 275, 249, 246, 235, 231; 715/764, 705; 379/168
See application file for complete search history.

(56) References Cited

U.S. PATENT DOCUMENTS

| | | | | |
|---|---|---|---|---|
| 6,157,913 A | * | 12/2000 | Bernstein | G10L 17/26 434/169 |
| 6,496,799 B1 | * | 12/2002 | Pickering | G10L 15/04 704/235 |
| 8,054,951 B1 | * | 11/2011 | Winslow | G06Q 30/06 379/88.01 |
| 8,082,499 B2 | * | 12/2011 | Hudson | A63F 13/10 715/702 |
| 8,195,457 B1 | * | 6/2012 | Lagassey | G10L 19/0018 704/231 |
| 9,477,823 B1 | * | 10/2016 | Ott | G06F 21/32 |

(Continued)

FOREIGN PATENT DOCUMENTS

JP 2002-91482 3/2002
JP 2007-296169 11/2007

(Continued)

OTHER PUBLICATIONS

Japanese Office Action mailed Oct. 25, 2016 in JP Patent Application 2014-161376.

*Primary Examiner* — Michael Colucci
(74) *Attorney, Agent, or Firm* — Nixon & Vanderhye P.C.

(57) ABSTRACT

Provided herein is a sound output device 200 that includes a microphone 270, a speaker 280, and a processor 210. The sound output device 200 continues a conversation either autonomously or in accordance with an instruction from a server when the message accepted via the microphone 270 does not correspond to a first emotion, and ends a conversation either autonomously or in accordance with an instruction from a server when the message accepted via the microphone 270 corresponds to the first emotion.

16 Claims, 20 Drawing Sheets

(56) References Cited

U.S. PATENT DOCUMENTS

| | | | | |
|---|---|---|---|---|
| 2003/0182123 | A1* | 9/2003 | Mitsuyoshi | G10L 17/26 704/270 |
| 2006/0215824 | A1* | 9/2006 | Mitby | G10L 15/22 379/100.05 |
| 2007/0071206 | A1* | 3/2007 | Gainsboro | H04M 3/2281 379/168 |
| 2008/0240379 | A1* | 10/2008 | Maislos | G06F 17/30855 379/88.13 |
| 2009/0210220 | A1 | 8/2009 | Mitsuyoshi et al. | |
| 2009/0306981 | A1* | 12/2009 | Cromack | G06F 17/30743 704/235 |
| 2010/0278318 | A1* | 11/2010 | Flockhart | G10L 17/26 379/88.04 |
| 2011/0184736 | A1* | 7/2011 | Slotznick | G10L 15/1815 704/249 |
| 2011/0282662 | A1* | 11/2011 | Aonuma | G10L 17/26 704/231 |
| 2012/0008754 | A1* | 1/2012 | Mukherjee | G10L 15/22 379/88.18 |
| 2013/0093833 | A1* | 4/2013 | Al-Asaaed | H04L 51/10 348/14.02 |
| 2013/0212501 | A1* | 8/2013 | Anderson | G06F 3/0484 715/764 |
| 2014/0257820 | A1* | 9/2014 | Laperdon | G10L 25/63 704/270 |
| 2014/0280296 | A1* | 9/2014 | Johnston | G06F 17/30011 707/769 |
| 2014/0288939 | A1* | 9/2014 | Beaurepaire | G01C 21/3655 704/276 |
| 2014/0365226 | A1* | 12/2014 | Sinha | G10L 25/00 704/275 |
| 2015/0149391 | A1* | 5/2015 | Ziolko | G06N 7/02 706/11 |
| 2015/0262574 | A1* | 9/2015 | Terao | G10L 25/63 704/246 |
| 2015/0302423 | A1* | 10/2015 | Thirugnanasundaram | G06Q 30/0201 705/7.29 |
| 2015/0310877 | A1* | 10/2015 | Onishi | H04M 3/51 704/246 |

FOREIGN PATENT DOCUMENTS

| | | |
|---|---|---|
| JP | 2009-294647 | 12/2009 |
| JP | 4851447 | 10/2011 |
| JP | 2012-449 | 1/2012 |
| JP | 2014-219594 A | 11/2014 |

* cited by examiner

| NEGATIVE EMOTIONS | POSITIVE EMOTIONS |
|---|---|
| FEAR, ANGER, UNPLEASURE, IRRITATION, BITTERNESS, IMPATIENCE, OBSESSION | RELIEF |
| DISCONTENT, REGRET, OBSESSION | CONTENT, CURIOSITY, EAGERNESS |
| SADNESS, PAIN | HAPPINESS |
| DISGUST, HATRED | AFFECTION |
| CONTEMPT, GRUDGE, JEALOUSY | RESPECT |

OPPOSITE EMOTIONS

FIG.5

| EMOTIONS | ASSOCIATED WORDS |
|---|---|
| JOY | GLAD |
| | HAPPY |
| | LIKE |
| | THANK |
| | ADORE |
| | FRIENDLY |
| | ⋮ |
| ANGER | ANGRY |
| | FRUSTRATED |
| | UNACCEPTABLE |
| | RIDICULOUS |
| | DISTRACTED |
| | IRRITATED |
| | ⋮ |
| SADNESS (GRIEF) | SAD |
| | POOR |
| | CRYING |
| | EMPTY |
| | LONELY |
| | DESPAIR |
| | ⋮ |
| JOY | FUN |
| | THRILLED |
| | FEELING GOOD |
| | INTERESTING |
| | AMUSING |
| | MOE |
| | ⋮ |

FIG.16

| EMOTIONS | ASSOCIATED WORDS |
|---|---|
| ANGER | ANGRY |
| | FRUSTRATED |
| | UNACCEPTABLE |
| | RIDICULOUS |
| | DISTRACTED |
| | IRRITATED |
| | ⋮ |
| SADNESS | SAD |
| | POOR |
| | CRYING |
| | EMPTY |
| | LONELY |
| | DESPAIR |
| | ⋮ |
| ANXIETY | WORRIED |
| | UNRESTING |
| | UNEASY |
| | HELPLESS |
| | HARD |
| | DEPRESSED |
| | ⋮ |
| JOY | GLAD |
| | FUN |
| | HAPPY |
| | LIKE |
| | THRILLED |
| | FEELING ALRIGHT (FEELING GOOD) |
| | ⋮ |

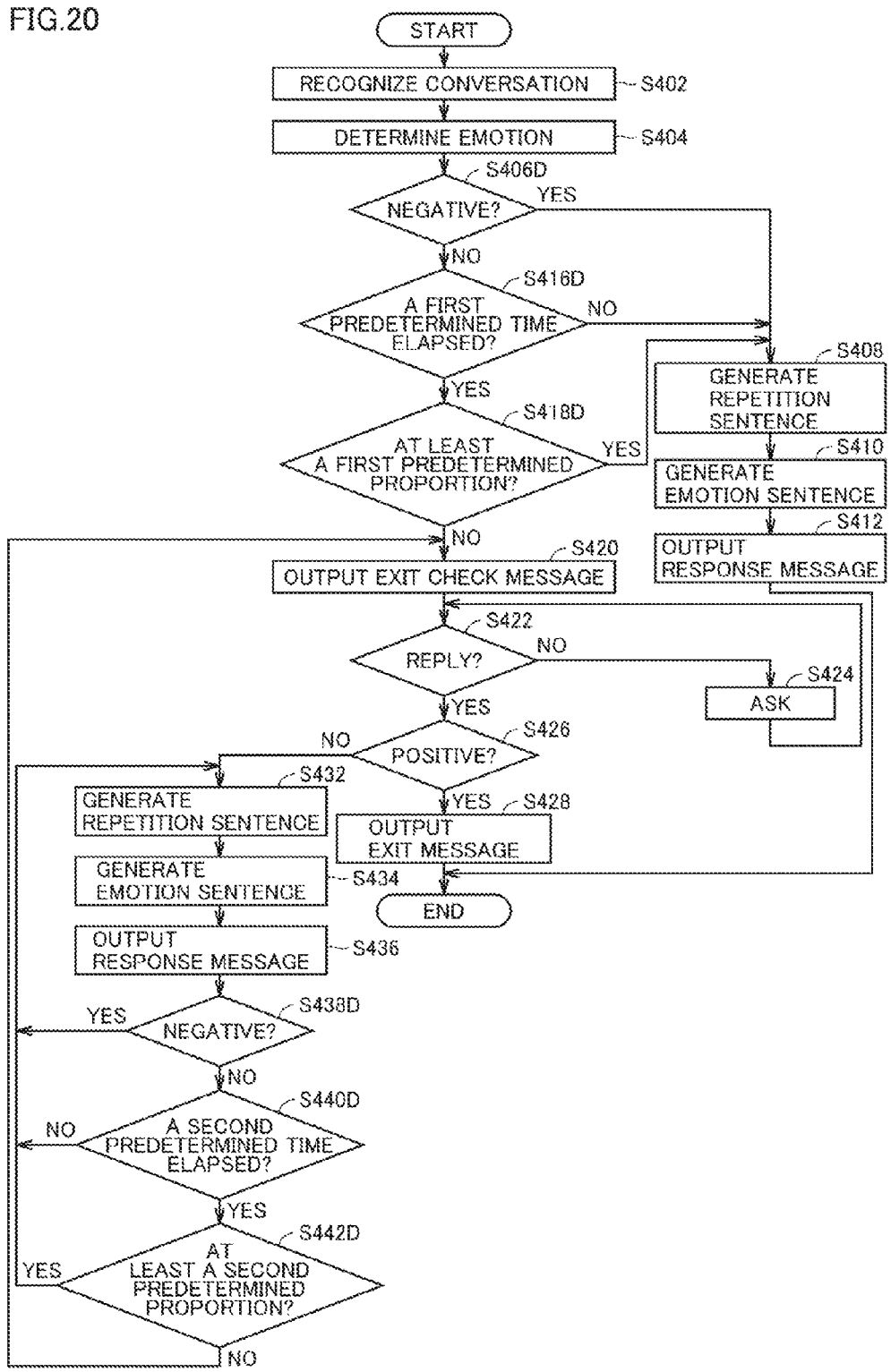

SOUND OUTPUT DEVICE, NETWORK SYSTEM, AND SOUND OUTPUT METHOD

This application claims priority to JP Patent Application No. 2014-161376 filed Aug. 7, 2014, the entire content of which is hereby incorporated by reference.

BACKGROUND OF THE INVENTION

Field of the Invention

The present invention relates to techniques to output sound from sound output devices such as robots and smartphones. Particularly, the invention relates to techniques concerning sound output devices that are capable of accepting messages through a microphone, and outputting messages through a speaker.

Description of the Related Art

Techniques to output sound from sound output devices such as robots and smartphones are known. Sound output devices that are capable of accepting messages through a microphone, and outputting messages through a speaker are also proposed.

For example, JP-A-2002-091482 (Patent Literature 1) discloses an emotion detection method, an emotion detection device, and a storage medium. The emotion detection method described in this publication is a method for detecting subject's emotions, whereby the sound level, the tempo indicative of the rate of occurrence of sound, and the intonation indicative of the pattern of sound level changes in each word are detected from input sound signals, and the amounts of change of the detected sound level, tempo, and intonation are determined to generate signals indicative of the states of the emotions of at least anger, sadness, and joy based on the amounts of change determined.

JP-A-2007-296169 (Patent Literature 2) discloses a mood determining device, and a program. The mood determining device of this publication determines subject's physiological excitement (hereinafter, "biological excitement") by using biological information. The device also determines subject's sound excitement (hereinafter, "vocal excitement") by using subject's sound signals. These two types of excitement (biological excitement and vocal excitement) are compared to infer a subject's mood.

Japanese Patent No. 4851447 (Patent Literature 3) discloses a sound analysis device, a sound analysis method, and a sound analysis program for detecting pitch frequency. The sound analysis device of this publication includes: a sound obtaining section that fetches a subject's sound signal; a frequency converting section that converts the sound signal into a frequency spectrum; an auto-correlation section that determines an auto-correlation waveform while shifting the frequency spectrum on a frequency axis; and a pitch detecting section that performs regression analysis on a distribution of the order of occurrence of multiple extremal values of the auto-correlation waveform, and the occurrence frequency representing an amount of a shifted frequency indicative of the occurrence locations of the extremal values, and determines the pitch frequency from the slope of the regression line.

JP-A-2009-294647 (Patent Literature 4) discloses a behavior analysis device and a call center system. This publication provides a sound input section that accepts a subject's speech sound signal; an arithmetic section that calculates a plurality of sound feature amounts from the sound signal; a storage section that stores an emotion table in which a plurality of subject's emotions are associated with a plurality of sound feature amounts, and a behavior table in which the occurrence patterns of a plurality of emotions are associated with subject's behaviors; an analyzing section that uses the emotion table and the behavior table to analyze subject's emotions based on the plurality of sound feature amounts, and predict a subject's behavior; and a display section that outputs and displays the result of the subject's behavior prediction made by the analyzing section.

JP-A-2012-449 (Patent Literature 5) discloses a behavior analysis method and a behavior analysis device. This publication provides an input procedure by which a subject's speech is obtained as a sound signal; an arithmetic procedure by which a plurality of sound feature amounts is calculated from the sound signal; and a predicting procedure by which the physiological activity and the emotion state of the subject are analyzed to predict a subject's behavior by using the plurality of sound feature amounts.

Of particular importance in providing a conservation that a user finds pleasant is how to end a conversation. However, conversations are ended rather unilaterally, or messages to end conversations are not necessarily available in the first place in the sound output devices of related art.

SUMMARY OF INVENTION

It is accordingly an object of the present invention to provide a sound output device, a network system, a sound output method, and a sound output program that allow a user to more pleasantly end a conversation than in related art.

According to an aspect of the invention, there is provided a sound output device that includes a microphone, a speaker, and a processor. The processor continues a conversation when a message accepted via the microphone does not correspond to a first emotion, and ends a conversation when a message accepted via the microphone corresponds to the first emotion.

Preferably, the first emotion includes at least one of relief, content, curiosity, eagerness, happiness, affection, and respect, and the processor determines that the message corresponds to the first emotion when the message contains a word that corresponds to at least one of relief, content, curiosity, eagerness, happiness, affection, and respect.

Preferably, the processor makes the speaker output a predetermined message when the accepted message corresponds to the first emotion, and continues a conversation through the speaker when the answer to the predetermined message does not correspond to the first emotion, and ends a conversation when the answer to the predetermined message corresponds to the first emotion.

Preferably, the processor continues a conversation via the speaker when a plurality of messages accepted via the microphone does not correspond to the first emotion, and ends a conversation when a plurality of messages accepted via the microphone corresponds to the first emotion.

Preferably, the processor continues a conversation via the speaker when at least one message accepted via the microphone during a predetermined time period does not correspond to the first emotion, and ends a conversation when at least one message accepted via the microphone during a predetermined time period corresponds to the first emotion.

Preferably, the processor continues a conversation via the speaker when at least a predetermined proportion of messages accepted a predetermined number of times via the microphone does not correspond to the first emotion, and ends a conversation when at least a predetermined proportion of messages accepted a predetermined number of times via the microphone corresponds to the first emotion.

Preferably, the processor continues a conversation via the speaker when at least a predetermined proportion of at least one message accepted via the microphone during a predetermined time period does not correspond to the first emotion, and ends a conversation when at least a predetermined proportion of at least one message accepted via the microphone during a predetermined time period corresponds to the first emotion.

Preferably, the processor makes the speaker output a message that conforms to the message input through the microphone.

Preferably, the processor makes the speaker output a message that has substantially the same meaning as the message accepted via the microphone.

Preferably, the processor makes the speaker output a word that expresses an emotion corresponding to the message accepted via the microphone.

Preferably, the processor in ending a conversation makes the speaker output a message that indicates an upcoming action of the sound output device.

Preferably, the sound output device further includes a communication interface for communicating with a server. The processor from the server via the communication interface receives a message to be output from the speaker.

According to another aspect of the invention, there is provided a sound output method for a sound output device that includes a microphone, a speaker, and a processor. The sound output method includes the processor performing a process to continue a conversation when a message accepted via the microphone does not correspond to a first emotion, and the processor performing a process to end a conversation when a message accepted via the microphone corresponds to the first emotion.

According to another aspect of the invention, there is provided a sound output program for a sound output device that includes a microphone, a speaker, and a processor. The sound output program causes the processor to continue a conversation via the speaker when a message accepted via the microphone does not correspond to a first emotion, and to end a conversation when a message accepted via the microphone corresponds to the first emotion.

According to another aspect of the invention, there is provided a network system that includes a sound output device, and a server that communicates with the sound output device. The server causes the sound output device to continue a conversation when a message accepted by the sound output device does not correspond to a first emotion, and to end a conversation when a message accepted by the sound output device corresponds to the first emotion.

According to another aspect of the invention, there is provided a sound output method for a network system that includes a sound output device, and a server adapted to communicate with the sound output device. The sound output method includes the sound output device accepting a message, the server determining whether the message corresponds to a first emotion, the server causing the sound output device to continue a conversation when the message does not correspond to the first emotion, and the server causing the sound output device to end a conversation when the message corresponds to the first emotion.

According to another aspect of the invention, there is provided a server that includes a communication interface for communicating with a sound output device, and a processor. The processor receives a message from the sound output device via the communication interface. The processor via the communication interface causes the sound output device to continue a conversation when the message does not correspond to a first emotion, and to end a conversation when the message correspond to the first emotion.

According to another aspect of the invention, there is provided a sound output method for a server that includes a communication interface for communicating with a sound output device, and a processor. The sound output method includes the processor receiving a message from the sound output device via the communication interface, the processor determining whether the message corresponds to a first emotion, the processor via the communication interface causing the sound output device to continue a conversation when the message does not correspond to the first emotion, and the processor via the communication interface causing the sound output device to end a conversation when the message corresponds to the first emotion.

According to another aspect of the invention, there is provided a sound output program for a server that includes a communication interface for communicating with a sound output device, and a processor. The sound output program causes the processor to perform receiving a message from the sound output device via the communication interface, determining whether the message corresponds to a first emotion, causing the sound output device to continue a conversation via the communication interface when the message does not correspond to the first emotion, and causing the sound output device to end a conversation via the communication interface when the message corresponds to the first emotion.

According to another aspect of the invention, there is provided a sound output device that includes a microphone, a speaker, and a processor. The processor continues a conversation when a message accepted via the microphone corresponds to a second emotion, and ends a conversation when a message accepted via the microphone does not correspond to the second emotion.

According to another aspect of the invention, there is provided a sound output method for a sound output device that includes a microphone, a speaker, and a processor. The sound output method includes the processor performing a process to continue a conversation when a message accepted via the microphone corresponds to a second emotion, and the processor performing a process to end a conversation when a message accepted via the microphone does not correspond to the second emotion.

According to another aspect of the invention, there is provided a sound output program for a sound output device that includes a microphone, a speaker, and a processor. The sound output program causes the processor to continue a conversation via the speaker when a message accepted via the microphone corresponds to a second emotion, and to end a conversation when a message accepted via the microphone does not correspond to the second emotion.

According to another aspect of the invention, there is provided a network system that includes a sound output device, and a server that communicates with the sound output device. The server causes the sound output device to continue a conversation when a message accepted by the sound output device corresponds to a second emotion, and to end a conversation when a message accepted by the sound output device does not correspond to the second emotion.

According to another aspect of the invention, there is provided a sound output method for a network system that includes a sound output device, and a server adapted to communicate with the sound output device. The sound output method includes the sound output device accepting a message, the server determining whether the message corresponds to a second emotion, the server causing the sound output device to continue a conversation when the message corresponds to the second emotion, and the server causing the sound output device to end a conversation when the message does not correspond to the second emotion.

According to another aspect of the invention, there is provided a server that includes a communication interface for communicating with a sound output device, and a processor. The processor receives a message from the sound output device via the communication interface. The processor via the communication interface causes the sound output device to continue a conversation when the message corresponds to a second emotion, and to end a conversation when the message does not correspond to the second emotion.

According to another aspect of the invention, there is provided a sound output method for a server that includes a communication interface for communicating with a sound output device, and a processor. The sound output method includes the processor receiving a message from the sound output device via the communication interface, the processor determining whether the message corresponds to a second emotion, the processor via the communication interface causing the sound output device to continue a conversation when the message corresponds to the second emotion, and the processor via the communication interface causing the sound output device to end a conversation when the message does not correspond to the second emotion.

According to another aspect of the invention, there is provided a sound output program for a server that includes a communication interface for communicating with a sound output device, and a processor. The sound output program causes the processor to receive a message from the sound output device via the communication interface, determine whether the message corresponds to a second emotion, cause the sound output device to continue a conversation via the communication interface when the message corresponds to the second emotion, and cause the sound output device to end a conversation via the communication interface when the message does not correspond to the second emotion.

In this way, the present invention can provide a sound output device, a network system, a sound output method, and a sound output program that allow a user to more pleasantly end a conversation than in related art.

Additional features and advantages of the present disclosure will be set forth in the following detailed description. Alternatively, additional features and advantages will be readily apparent to those skilled in the art from the content of the detailed description, or will be recognized by practicing the invention described herein, including the detailed description, the claims, and the appended drawings. It is to be understood that the foregoing general description concerning the related art and the following detailed description are provided solely for illustrative purposes, and are intended to provide an overview or framework for understanding the nature and character of the invention as claimed.

BRIEF DESCRIPTION OF THE DRAWINGS

FIG. 5 is a schematic diagram representing the data structure of an emotion database 121 according to the embodiment of the invention.

FIG. 16 is a schematic diagram representing the data structure of an emotion database 121 according to Sixth Embodiment.

FIG. 20 is a schematic diagram representing the sound output process in a sound output device 200 according to Tenth Embodiment.

DESCRIPTION OF THE PREFERRED EMBODIMENTS

Figure 1:
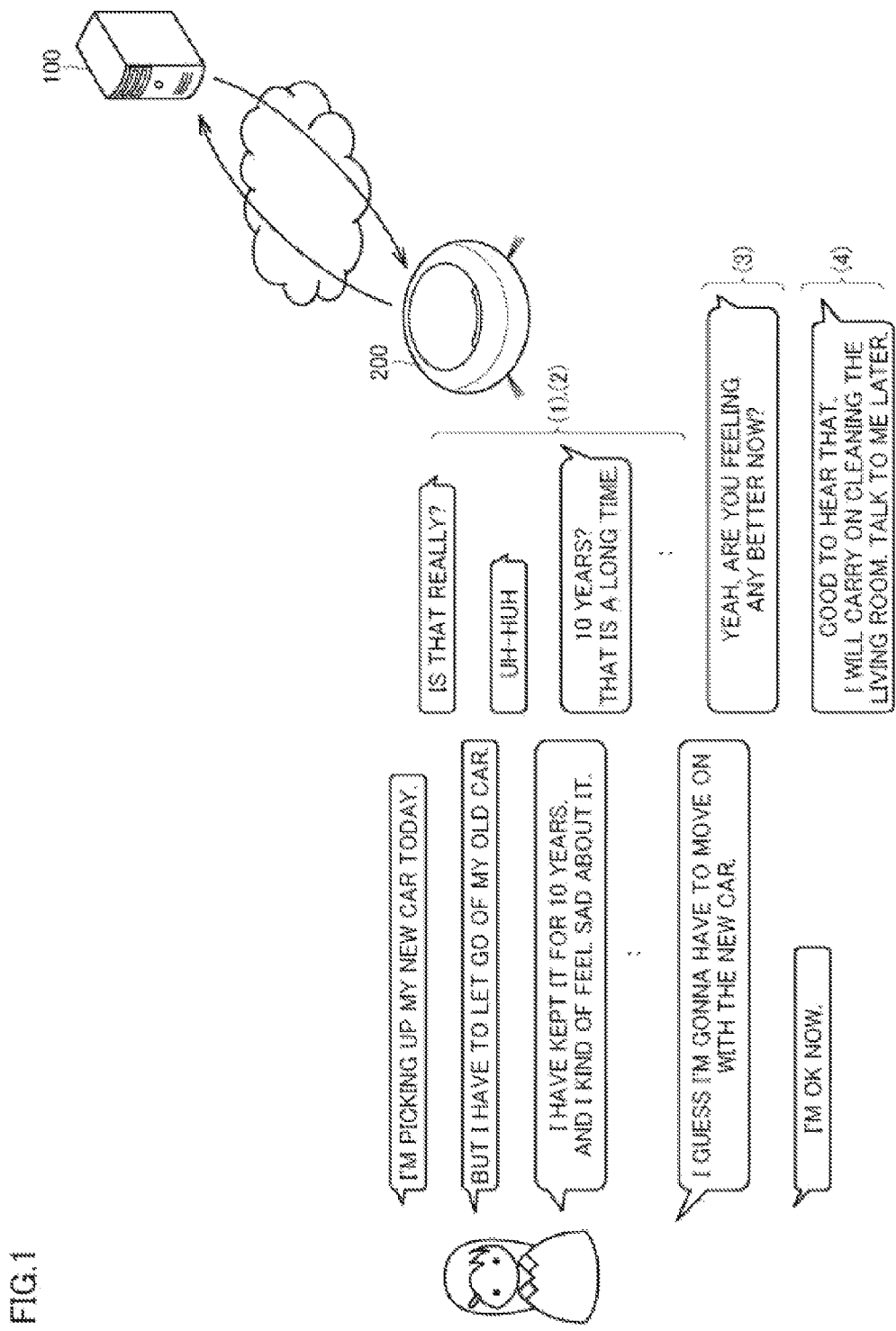
FIG. 1 is a schematic diagram representing the overall configuration and a first brief overview of the operation of a network system 1 according to an embodiment of the invention.

Embodiments of the present invention are described below with reference to the accompanying drawings. In the following descriptions, like elements are given like reference numerals. Such like elements will be referred to by the same names, and have the same functions. Accordingly, detailed descriptions of such elements will not be repeated.

First Embodiment

Overall Configuration of Network System

The overall configuration of the network system 1 according to the present embodiment is described below with reference to FIG. 1. FIG. 1 is a schematic diagram representing the overall configuration and a first brief overview of the operation of the network system 1 according to the present embodiment.

The network system 1 mainly includes a server 100, and a sound output device 200 adapted to communicate data with the server 100 via a network such as the Internet. The network system 1 may include a plurality of sound output devices 200.

In the present embodiment, an autonomous vacuum cleaner will be described as an example of the sound output device 200. The sound output device 200, however, is not limited to a vacuum cleaner. Other examples include home appliances such as air conditioners, refrigerators, air purifiers, humidifiers, dehumidifiers, autonomous vacuum cleaners, illuminations, and clocks; AV (audio-visual) devices such as televisions, hard disk recorders, gaming machines, music players, and personal computers; and household equipment such as photovoltaic generators, intercoms, and water heaters. The sound output device 200 is typically installed in homes or offices, but may be installed in other locations such as in stores, event sites, and stations.

<First Brief Overview of Network System Operation>

Referring to FIG. 1, a first brief overview of the operation of the network system 1 according to the present embodiment is described below. In this first brief overview, the operation of the network system 1 will be described through the case where the sound output device 200 guides a user to have a positive emotion when the user has a negative emotion, and ends a conversation while the user is having a positive emotion.

Figure 2:
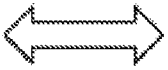
FIG. 2 is a table representing examples of positive emotions and negative emotions according to the embodiment of the invention.

Positive emotions (first emotion) and negative emotions (second emotion) are described below. FIG. 2 is a table representing examples of positive emotions and negative emotions according to the present embodiment. Referring to FIG. 2, the positive emotions in the present embodiment are pleasant emotions, for example, such as relief, content, curiosity, eagerness, happiness, affection, and respect. Examples of negative emotions include fear, anger, unpleasure, irritation, bitterness, impatience, obsession, discontent, regret, sadness, pain, disgust, hatred, contempt, grudge, and jealousy.

Referring back to FIG. 1, a user talks to the sound output device 200 by saying "I'm picking up my new car today." Here, the user has both a negative emotion and a positive emotion, specifically, the sad feeling that he/she has to let go of his/her longtime car, and the happy feeling that the user is getting a new car ((1) and (2) in FIG. 1).

The sound output device 200 detects positive emotions and negative emotions from information such as the content of the user message, the intonation or accent of the speech sound, and the speaking speed of the user. Upon detecting a negative emotion in the user, the sound output device 200 continues a conversation until the user has a positive emotion. On the other hand, upon detecting a positive emotion in the user, the sound output device 200 guides the user to end the conversation while maintaining the positive emotion of the user ((1) and (2) in FIG. 1).

After several exchanges of conversations, the user talks to the sound output device 200 by saying "I guess I'm gonna have to move on with the new car." In response, the sound output device 200 detects a positive mood in the user, specifically a positive feeling ((3) in FIG. 1).

The sound output device 200 outputs a pre-exit message to determine whether to end the conversation. For example, the sound output device 200 asks the user the question "Are you feeling any better now?" ((3) in FIG. 1)

When the user gives the positive replay "I'm OK", the sound output device 200 outputs a message indicative of a future action of the device, together with a goodbye message. For example, the sound output device 200 ends the conversation with the output message "That is good. I will carryon cleaning the living room. Talk to me later." ((4) in FIG. 1)

<Second Brief Overview of Network System Operation>

Figure 3:
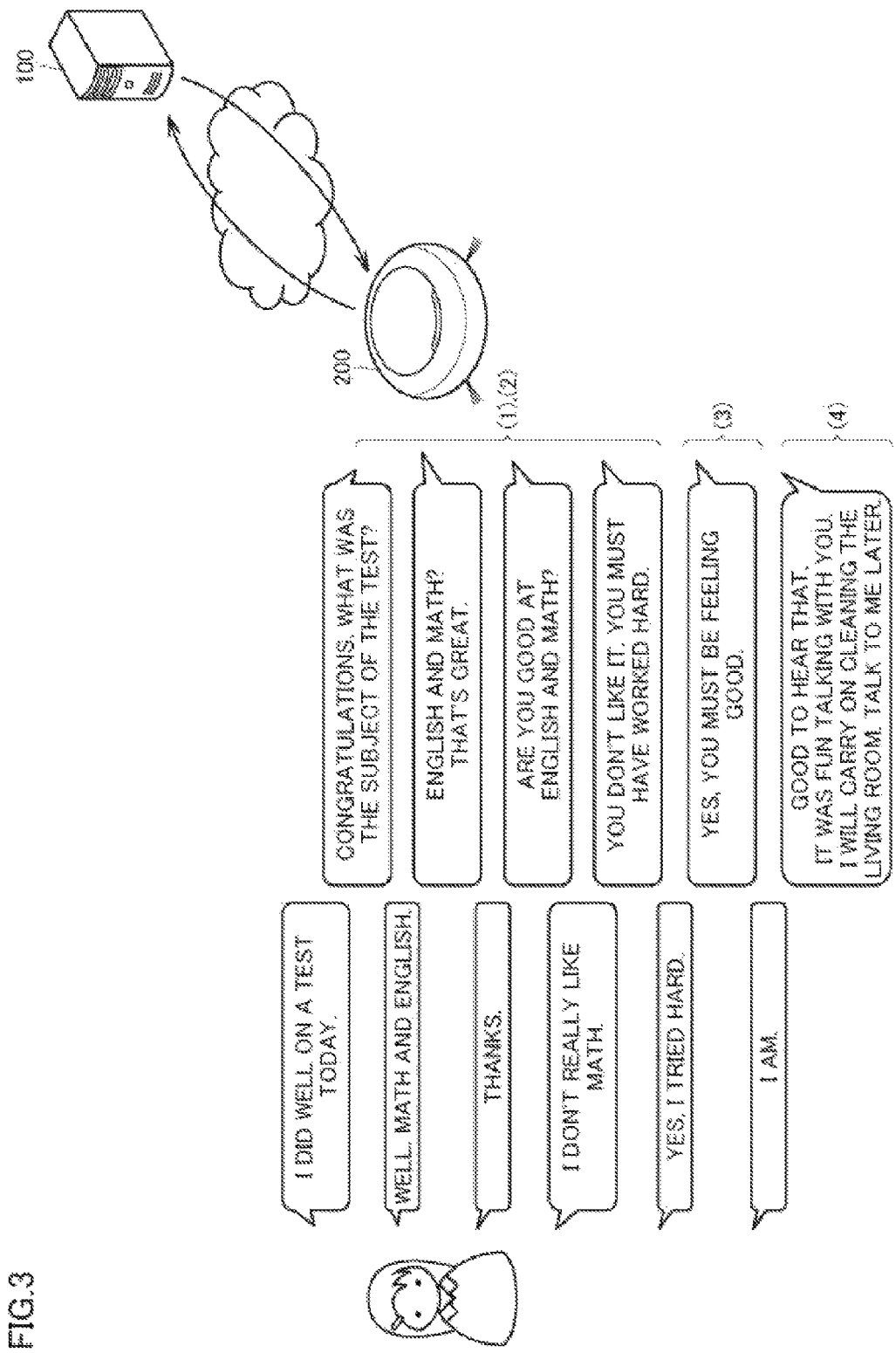
FIG. 3 is a schematic diagram representing the overall configuration and a second brief overview of the operation of the network system 1 according to the embodiment of the invention.

Referring to FIG. 3, a second brief overview of the operation of the network system 1 according to the present embodiment is described below. FIG. 3 is a schematic diagram representing the overall configuration and a second brief overview of the operation of the network system 1 according to the present embodiment. In this second brief overview, the operation of the network system 1 will be described through the case where the sound output device 200, upon finding that a user has a positive emotion, converses with the user to maintain the positive emotion, and ends the conversation while the user is having a positive emotion.

First, a user talks to the sound output device 200 by saying "I did well in a test today." Here, the user is having a positive emotion, the happy feeling that the test went well ((1) and (2) in FIG. 3).

The sound output device 200 detects positive emotions and negative emotions from information such as the content of the user message, the intonation or accent of the speech sound, and the speaking speed of the user. The sound output device 200 continues a conversation upon detecting a negative emotion in the user. On the other hand, upon detecting a positive emotion in the user, the sound output device 200 guides the user to end the conversation while maintaining the positive emotion of the user ((1) and (2) in FIG. 3).

After several exchanges of conversations, the user talks to the sound output device 200 by saying "I tried hard." In response, the sound output device 200 detects a positive mood in the user, specifically a positive feeling ((3) in FIG. 3).

Upon detecting a positive emotion in the user, the sound output device 200 outputs a pre-exit message to determine whether to end the conversation. For example, the sound output device 200 asks the user that "You must be feeling good." ((3) in FIG. 3)

When the user gives the positive reply "I am", the sound output device 200 outputs a message indicative of a future action of the device, together with a goodbye message. For example, the sound output device 200 ends the conversation with the output message "Good to hear that. It was fun talking with you. I will carry on cleaning the living room. Talk to me later." ((4) in FIG. 3)

In this manner, in the network system 1 according to the present embodiment, the sound output device 200 ends a conversation after the user had a positive feeling, and allows the user to end conversation more pleasantly than in related art.

More specifically, the sound output device 200 may output a message indicative of a future action of the device when the user's emotion swings from a negative emotion to a positive emotion. The hardworking attitude of the sound output device 200 might encourage the user to work hard. In other word, the sound output device 200 may only output a goodbye message without a message indicative of a future action of the device when the user has a positive emotion from the beginning of conversation.

The following specifically describes how such functions are realized in the network system 1.

<Hardware Configuration of Server 100>

Figure 4:
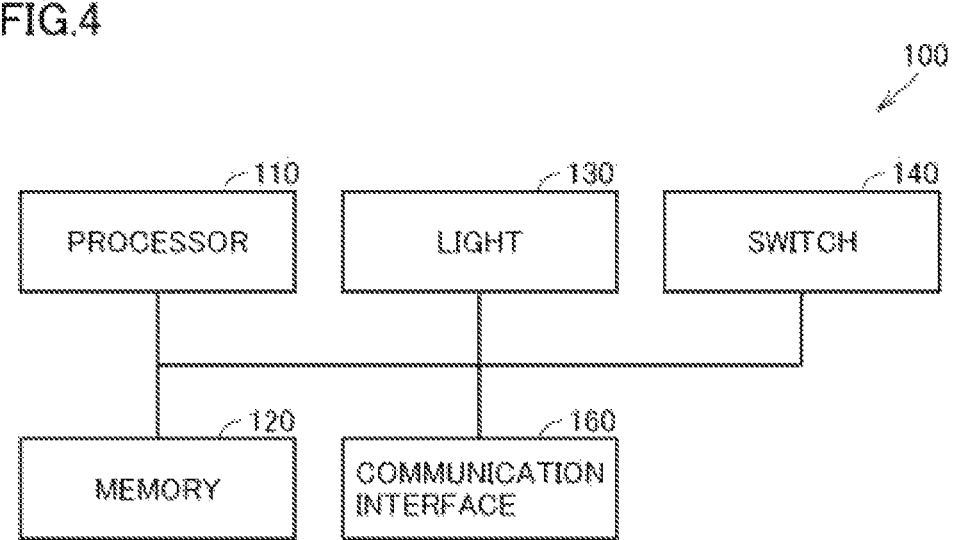
FIG. 4 is a block diagram representing the hardware configuration of a server 100 according to the embodiment of the invention.

The following describes an aspect of the hardware configuration of the server 100 in the network system 1. FIG. 4 is a block diagram representing the hardware configuration of the server 100 according to the present embodiment.

Referring to FIG. 4, the main constituting elements of the server 100 include a processor 110, a memory 120, various lights 130, various switches 140, and a communication interface 160.

The processor 110 controls each part of the server 100 by running programs stored in the memory 120 or in external storage media. Specifically, the processor 110 executes the sound output programs stored in the memory 120 to perform various processes, as will be described later.

The memory 120 is realized by various types of memory, including, for example, RAM (Random Access Memory), ROM (Read-Only Memory), and flash memory. The memory 120 may also be realized by, for example, storage media used with an interface, including, for example, USB® (Universal Serial Bus) memory, CD (Compact Disc), DVD (Digital Versatile Disk), memory card, hard disk, IC (Integrated Circuit) card, optical memory card, mask ROM, EPROM (Erasable Programmable Read Only Memory), and EEPROM (Electronically Erasable Programmable Read-Only Memory).

The memory 120 stores sound output programs and other programs run by the processor 110, data generated after the execution of a program by the processor 110, input data, and data received from the sound output device 200. Specifically, for example, the memory 120 stores an emotion database 121.

The emotion database 121 and other data may be stored in a device different from the server 100. In this case, the processor 110 of the server 100 is adapted to refer to the emotion database 121 via the communication interface 160.

The emotion database 121 and other database may be stored in part in a memory of the sound output device 200.

The emotion database 121 is described below. FIG. 5 is a schematic diagram representing the data structure of the emotion database 121 according to the present embodiment. Referring to FIG. 5, the emotion database 121 in the present embodiment stores four kinds of emotions with keywords associated with these emotions.

The four emotions in the present embodiment are joy, anger, sadness, and delight. The joy and delight represent positive emotions, and the anger and sadness represent negative emotions. In this way, the processor 110, by referring to the emotion database 121, is able to specify a user's emotion from keywords spoken by the user, and determine whether the user has a positive emotion or a negative emotion.

Preferably, the memory 120 additionally stores a database used to vocally output user's emotions in response to user messages. In the database, for example, the message "You are tired" is associated with user messages such as "It was a busy day", or voice intonations characteristic of tiredness. Alternatively, for example, the message "You must be angry" is associated with user messages such as "I clashed with a friend of mine", or rough intonations in user's voice.

Referring back to FIG. 4, the lights 130 become on or off, or blink according to signals from the processor 110 to externally indicate the state of the server 100.

The switches 140 accept instructions from an administrator, and inputs the instructions to the processor 110.

The communication interface 160 sends data from the processor 110 to the sound output device 200 via, for example, the Internet, a carrier network, or a router. Oppositely, the communication interface 160 receives data from the sound output device 200 via, for example, the Internet, a carrier network, or a router, and passes the data to the processor 110.

<Hardware Configuration of Sound Output Device 200>

Figure 6:
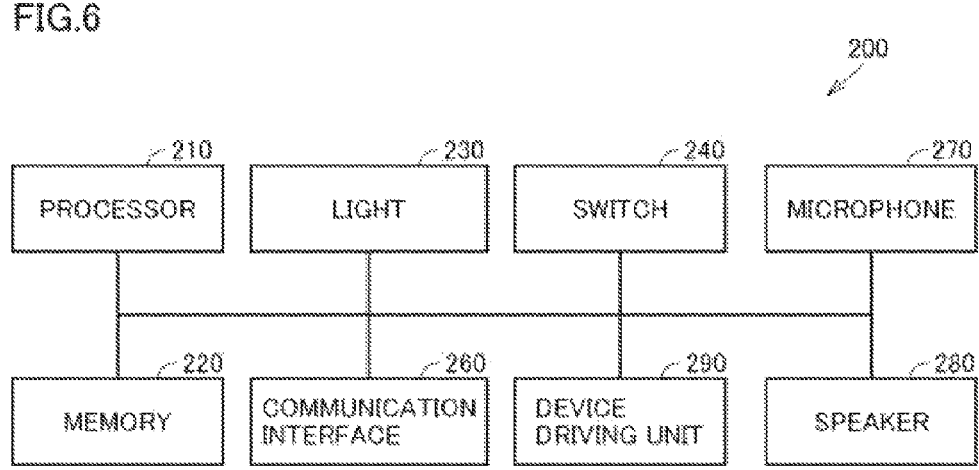
FIG. 6 is a block diagram representing the hardware configuration of a sound output device 200 according to the embodiment of the invention.

The following describes an aspect of the hardware configuration of the sound output device 200 according to the present embodiment. FIG. 6 is a block diagram representing the hardware configuration of the sound output device 200 according to the present embodiment.

Referring to FIG. 6, the main constituting elements of the sound output device 200 include a processor 210, a memory 220, various lights 230, various switches 240, a communication interface 260, a microphone 270, a speaker 280, and a device driving unit 290.

The processor 210 controls each part of the sound output device 200 by running programs stored in the memory 220 or in external storage media. Specifically, the processor 210 executes the sound output programs stored in the memory 220 to perform various processes, as will be described later.

Specific examples of the memory 220 are the same as those described for the memory 120 of the server 100, and will not be described.

The memory 220 stores data such as sound output programs and other programs run by the processor 210, data generated after the execution of a program by the processor 210, input data, and data received from the server 100.

The lights 230 become on or off, or blink according to signals from the processor 210 to externally indicate the state of the sound output device 200.

The switches 240 accept entry of user instructions, and input the instructions to the processor 210.

The communication interface 260 sends data from the processor 210, for example, such as user instructions, to the server 100 via, for example, an adapter, a router, or the Internet. Oppositely, the communication interface 260 receives data from the server 100 via, for example, the Internet, a router, or an adapter, and passes the data to the processor 210.

The microphone 270 accepts a user message, specifically sound input. The message is converted into a sound signal, and input to the processor 210.

The speaker 280 outputs various sounds such as messages to a user, speech sound, music, and movie based on sound signals from the processor 210.

The device driving unit 290 realizes the main roles of the sound output device 200 by controlling device components such as motors, actuators, and sensors according to control instructions from the processor 210.

<Functional Configuration of Server 100>

Figure 7:
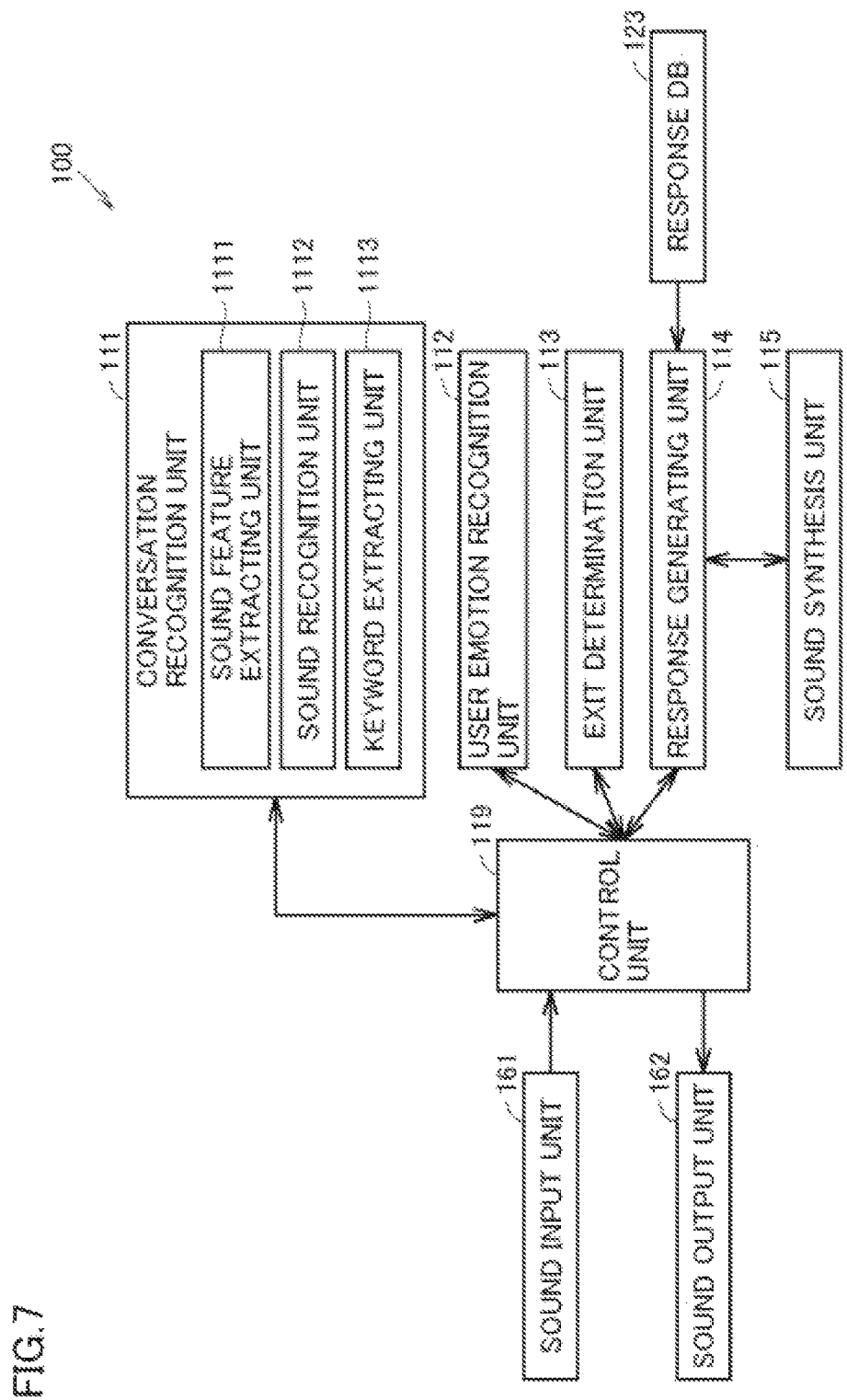
FIG. 7 is a block diagram representing the functional configuration of the server 100 according to the embodiment of the invention.

The functional configuration of the server 100 according to the present embodiment is described below with reference to FIG. 7. FIG. 7 is a block diagram representing the functional configuration of the server 100 according to the present embodiment.

The processor 110 executes programs in the memory 120 to realize a conversation recognition unit 111, a user emotion recognition unit 112, an exit determination unit 113, a response generating unit 114, a sound synthesis unit 115, and a control unit 119.

A sound input unit 161 and a sound output unit 162 are realized by the processor 110 controlling the communication interface 160 while executing the programs in the memory 120.

First, the sound input unit 161 from the sound output device 200 accepts sound data of the sound produced by the user. Specifically, in response to an incoming user message, the sound output device 200 produces sound data by converting the sound accepted via the microphone 270. The sound output device 200 then sends the sound data to the server 100.

The control unit 119 passes the sound data received by the sound input unit 161 to the conversation recognition unit 111.

The conversation recognition unit 111 recognizes the content of the conversation by using the sound data from the sound output device 200. For example, the conversation recognition unit 111 converts the sound data into text data.

Specifically, in the present embodiment, the conversation recognition unit 111 includes a sound feature extracting unit 1111, a sound recognition unit 1112, and a keyword extracting unit 1113. The sound feature extracting unit 1111 extracts the characteristic sound parameters from the received sound data. The sound recognition unit 1112 creates message text from the extracted parameters. From the text, the keyword extracting unit 1113 extracts keywords associated with emotions.

By using the accepted sound data, the emotion recognition unit 112 determines the current user emotion from the content or intonations of the message.

From the user's emotion, the exit determination unit 113 determines whether to continue the conversation, or send an exit check message, or a message for ending a conversation.

From the result of the exit determination, the response generating unit 114 creates various messages to be sent to the sound output device 200.

Specifically, the response generating unit 114 creates a message that repeats the words spoken by the user. For example, with the user saying "I got scorched today", the response generating unit 114 responds by saying "You got scorched."

By referring to a response DB, the response generating unit 114 creates a message that indicates the user's emotion. For example, in response to the user saying "I have a problem with what they are saying", the response generating unit 114 answers by saying "I understand that is very annoying."

The response DB stores keywords that might appear in user messages, and emotions associated with these keywords. The response generating unit 114 creates conversational sentences by combining repeat messages and messages that indicate user's emotions.

The response generating unit 114 also creates a message for checking whether the user has a positive emotion. For example, the response generating unit 114 outputs the message "Are you feeling OK now?" upon detecting positive emotions more than once.

The response generating unit 114 also creates an exit message. For example, the response generating unit 114 outputs the message "Good to hear that. It was fun talking with you. I will carry on cleaning the living room. Talk to me later."

In the present embodiment, the sound synthesis unit 115 creates sound data by using the text-format conversational sentences created by the response generating unit 114. However, the server 100 may send text data to the sound output device 200, and the sound output device 200 with its sound synthesis unit may create sound data from the text data.

The control unit 119 passes the created sound data to the sound output unit 162. The sound output unit 162 sends the sound data to the device.

<Overview of Sound Output Process in Server 100>

Figure 8:
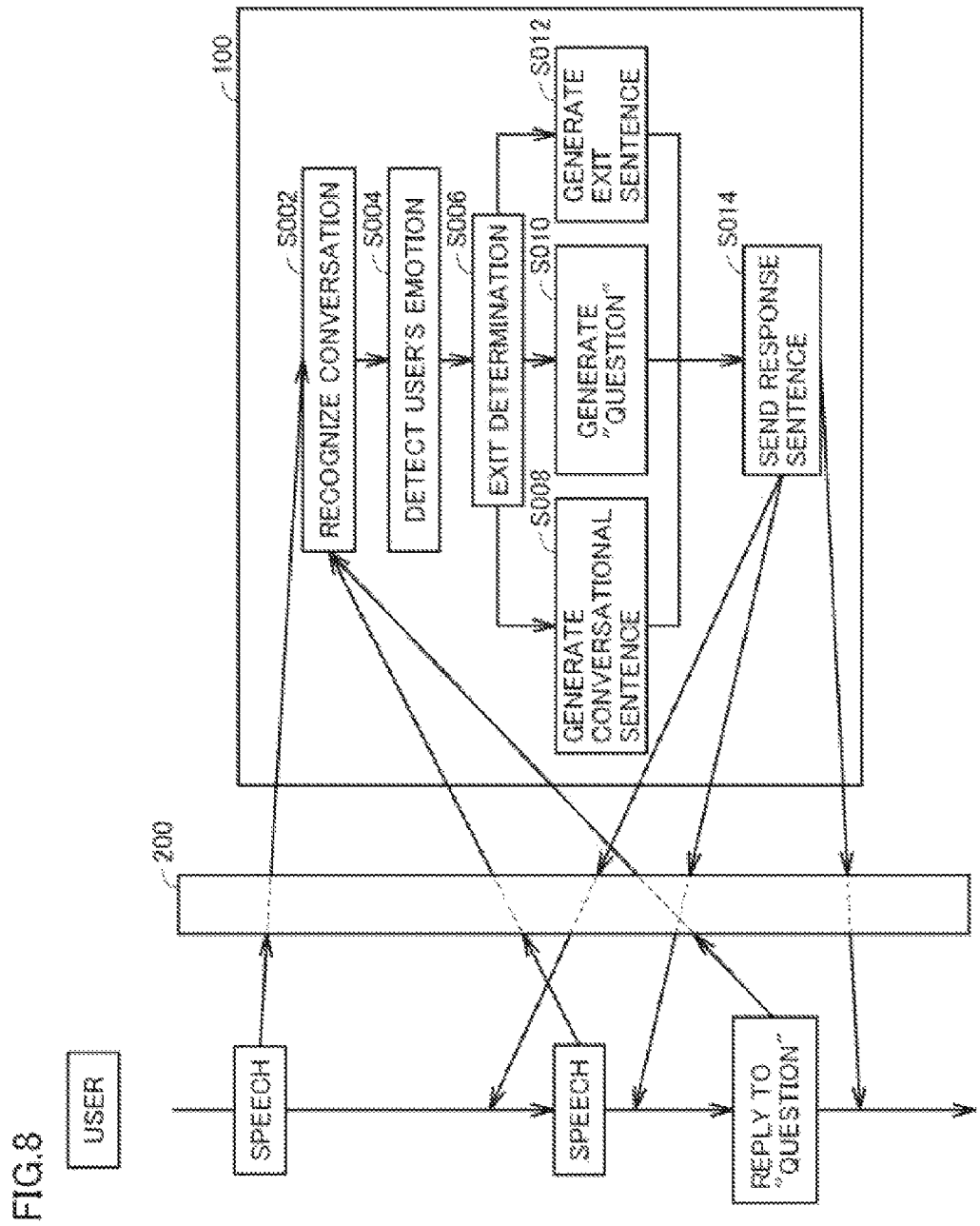
FIG. 8 is a schematic diagram representing the sound output process in the server 100 according to the embodiment of the invention.

The sound output process in the server 100 according to the present embodiment is described below with reference to FIG. 8. FIG. 8 is a schematic diagram representing the sound output process in the server 100 according to the present embodiment.

In response to a user producing a message, the sound output device 200 obtains sound data via the microphone 270. The sound output device 200 then sends the sound data to the server 100 via, for example, a router or the Internet. The processor 110 of the server 100 receives the sound data via the communication interface 160.

The processor 110 executes programs in the memory 120, and recognizes the content of the conversation by using the sound data (step S002).

By using the accepted sound data, the processor 110 determines the current user emotion from the content or intonations of the message (step S004).

From the user's emotion, the processor 110 determines whether to continue the conversation, or send an exit check message, or a message for ending a conversation (step S006).

From the result of the exit determination, the processor 110 creates a message for continuing the conversation (step S008). For example, the processor 110 creates a message that repeats the words spoken by the user, or a message that indicates the user's feeling, and combines these messages to create a conversational sentence. For example, in response to the user saying "It was a rough day", the processor 110 combines the message "You had a rough day", and the message "You sound very tired."

Alternatively, from the result of the exit determination, the processor 110 creates a message for checking whether the user has a positive emotion (step S010). For example, the processor 110 creates the message "Are you feeling any better now?"

Alternatively, from the result of the exit determination, the processor 110 creates an exit message (step S012). For example, the processor 110 creates a message indicative of a future action of the sound output device 200. The processor 110 creates the message "Take care. I'd better start cleaning the living room now."

The processor 110 sends the message it created to the sound output device 200 via the communication interface 160 (step S014). The sound output device 200 vocally outputs the received message.

<Details of Sound Output Process in Server 100>

Figure 9:
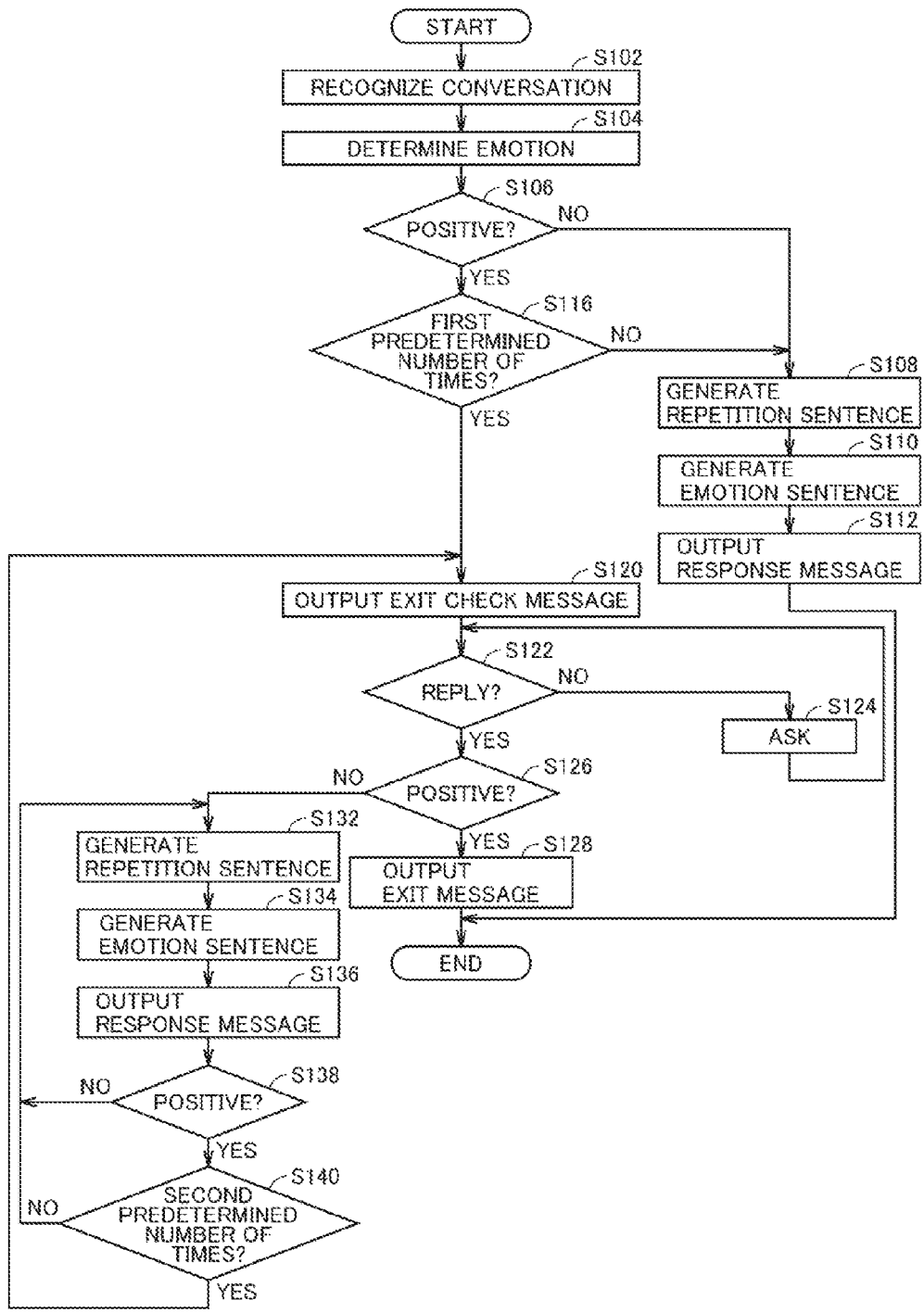
FIG. 9 is a flowchart representing the sound output process of the server 100 according to First Embodiment.

The sound output process of the server 100 according to the present embodiment is described below with reference to FIG. 9. FIG. 9 is a flowchart representing the sound output process of the server 100 according to the present embodiment.

The processor 110 of the server 100 performs the following sound output process upon receiving sound data from the sound output device 200 via the communication interface 160.

First, the processor 110 recognizes the content of the conversation by using the sound data (step S102). By referring to an emotion database 121 or an intonation table (not shown), the processor 110 determines the user's emotion from the content or intonations of the conversation so recognized (step S104).

The processor 110 determines whether the user has a positive emotion (step S106). If the user does not have a positive emotion (NO in step S106), the processor 110 generates a repetition sentence that repeats the words of the user (step S108).

By using the user's emotion so determined, the processor 110 generates an emotion sentence to vocally output the user's emotion (step S110). The processor 110 combines the repetition sentence and the emotion sentence to create a response message, and sends the response message to the sound output device 200 via the communication interface 160 (step S112). The processor 110 then ends the current sound output process.

On the other hand, if the user has a positive emotion (YES in step S106), the processor 110 determines whether a positive message has been consecutively accepted a first predetermined number of times (step S116). The processor 110 repeats the procedures from step S108 if a positive message has not been consecutively accepted the first predetermined number of times (NO in step S116).

If a positive message has been consecutively accepted the first predetermined number of times (YES in step S116), the processor 110 sends the sound output device 200 an exit check message, for example, "Are you feeling OK now?" via the communication interface 160 (step S120).

The processor 110 via the communication interface 160 determines whether there is a reply to the exit check message (step S122). If there is no reply to the exit check message (NO in step S122), the processor 110 resends the sound output device 200 an exit check message, or a message, for example, "Are you OK?", via the communication interface 160. The processor 110 repeats the procedures from step S122.

Upon receiving a reply to the exit check message (YES in step S122), the processor 110 determines whether the return message from the user is positive (step S126).

If the return message from the user is positive (YES in step S126), the processor 110 sends the sound output device 200 an exit message, for example, "That's good. Take care. I'd better start cleaning the living room now." via the communication interface 160 (step S128). The processor 110 then ends the sound output process.

If the return message from the user is not positive (NO in step S126), the processor 110 generates a repetition sentence for repeating the words of the user (step S132). By using the user's emotion it determined, the processor 110 generates an emotion sentence to vocally output the user's emotion (step S134). The processor 110 combines the repetition sentence and the emotion sentence to create a response message, and sends the response message to the sound output device 200 via the communication interface 160 (step S136).

The processor 110 determines whether the user has a positive emotion (step S138). If the user does not have a positive emotion (NO in step S138), the processor 110 repeats the procedures from step S132.

If the user has a positive emotion (YES in step S138), the processor 110 determines whether a positive message has been consecutively accepted a second predetermined number of times (step S140). In the present embodiment, the second predetermined number of times is smaller than the first predetermined number of times. The processor 110 repeats the procedures from step S132 if a positive message has not been consecutively accepted the second predetermined number of times (NO in step S140).

The processor 110 repeats the procedures from step S120 if a positive message has been consecutively accepted the second predetermined number of times (YES in step S140).

As described above, in the present embodiment, a conversation is ended while the user is having a positive feeling, and the user can more pleasantly end a conversation than in related art with the sound output device, the network system, the sound output method, and the sound output program of the embodiment.

Second Embodiment

In First Embodiment, the process to end a conversation is performed upon a positive emotion being consecutively detected a first predetermined number of times in a user. It is also possible, however, to perform the process to end a conversation under other conditions. For example, a conversation may be ended when a positive emotion is sustained during a first predetermined time period, as in the present embodiment.

Figure 10:
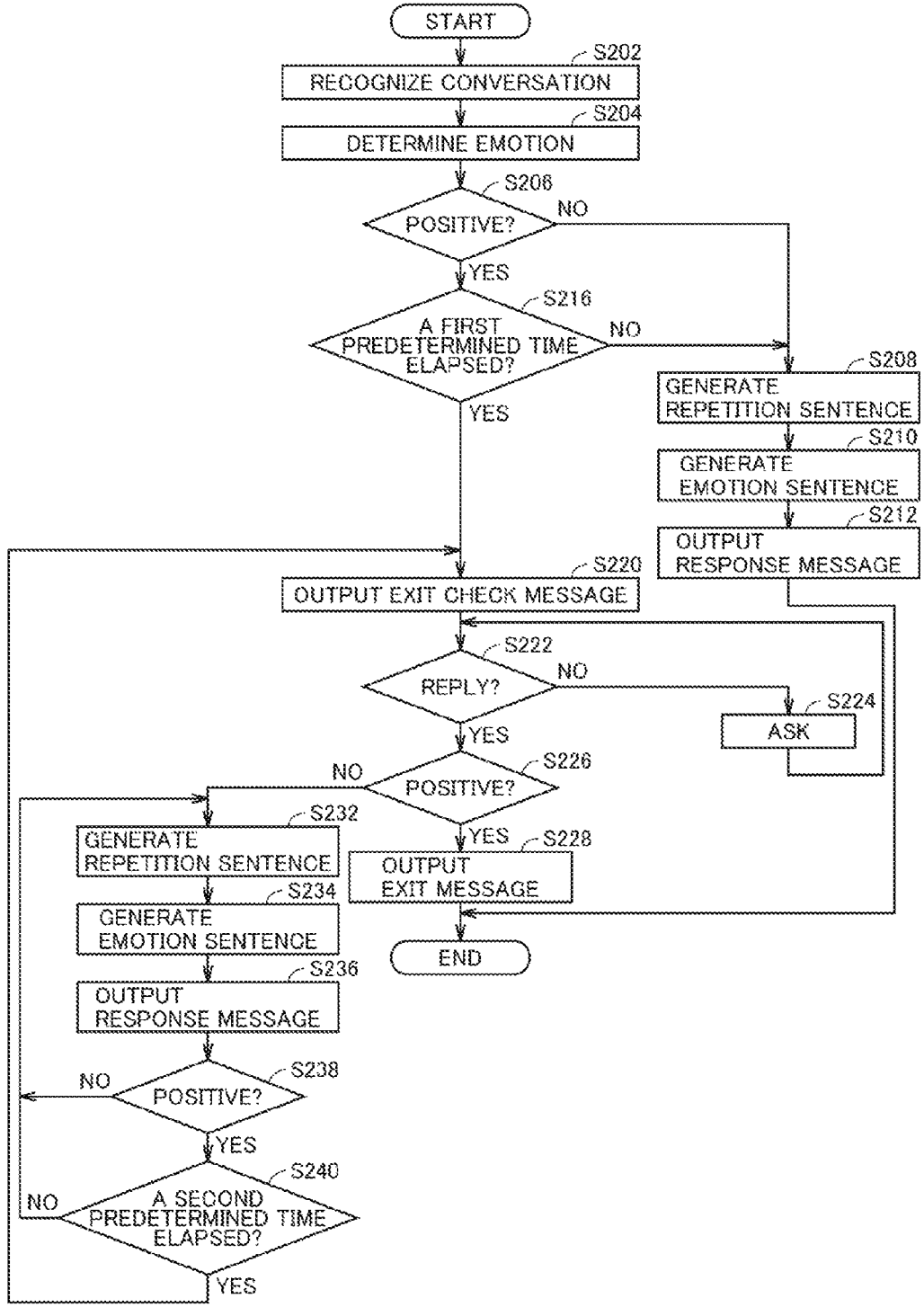
FIG. 10 is a flowchart representing the sound output process of a server 100 according to Second Embodiment.

A part of the sound output process of the server 100 according to the present embodiment is described below with reference to FIG. 10. The overall configuration of the network system 1, and the hardware configurations of the server 100 and the sound output device 200 are as described in First Embodiment, and will not be described. FIG. 10 is a flowchart representing the sound output process of the server 100 according to the present embodiment.

<Details of Sound Output Process in Server 100>

The following describes steps S216 and S240 with reference to FIG. 10. The other steps are the same as in the process described in FIG. 9, and will not be described.

In step S216, if the user has a positive emotion (YES in step S206), the processor 110 determines whether a positive message has been consecutively accepted during a first predetermined time period (step S216). The processor 110 repeats the procedures from step S208 if a positive message has not been consecutively accepted during the first predetermined time period (NO in step S216).

If a positive message has been consecutively accepted during the first predetermined time period (YES in step S216), the processor 110 sends the sound output device 200 an exit check message, for example, "Are you feeling OK now?" via the communication interface 160 (step S220).

If the user has a positive emotion (YES in step S238), the processor 110 in step S240 determines whether a positive message has been consecutively accepted during a second predetermined time period (step S240). In the present embodiment, the second predetermined time period is shorter than the first predetermined time period. The processor 110 repeats the procedures from step S232 if a positive message has not been consecutively accepted during the second predetermined time period (NO in step S240).

The processor 110 repeats the procedures from step S220 if a positive message has been consecutively accepted during the second predetermined time period (YES in step S240).

As described above, in the present embodiment, a conversation is ended while the user is having a positive feeling, and the user can more pleasantly end a conversation than in related art with the sound output device, the network system, the sound output method, and the sound output program of the embodiment.

Third Embodiment

In First Embodiment, the process to end a conversation is performed upon a positive emotion being consecutively detected a first predetermined number of times in a user. It is also possible, however, to perform the process to end a conversation under other conditions. For example, a conversation may be ended when positive emotions detected a first predetermined number of times account for at least a first predetermined proportion, as in the present embodiment.

Figure 11:
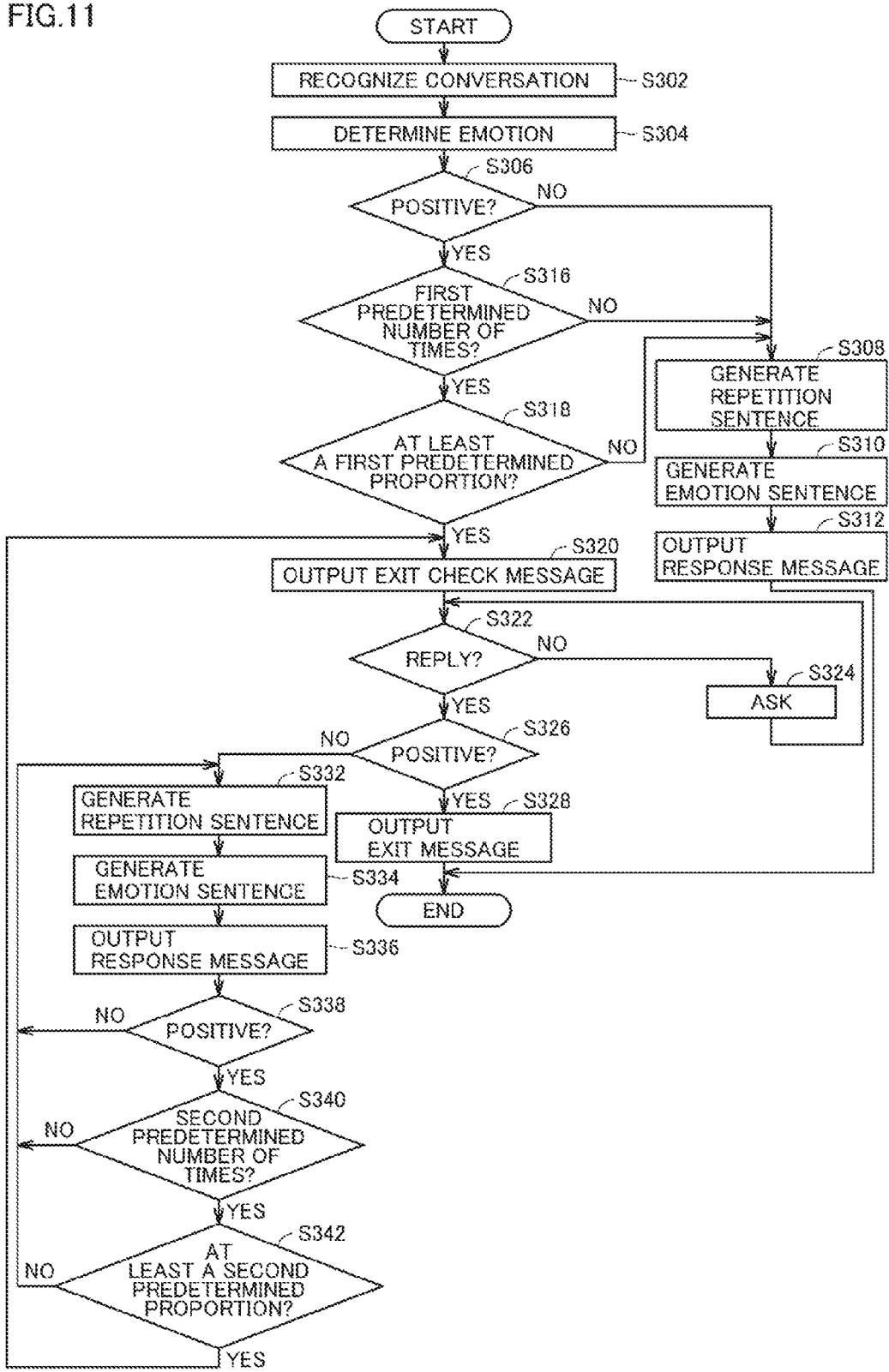
FIG. 11 is a flowchart representing the sound output process of a server 100 according to Third Embodiment.

A part of the sound output process of the server 100 according to the present embodiment is described below with reference to FIG. 11. The overall configuration of the network system 1, and the hardware configurations of the server 100 and the sound output device 200 are as described in First Embodiment, and will not be described. FIG. 11 is a flowchart representing the sound output process of the server 100 according to the present embodiment.

<Details of Sound Output Process in Server 100>

The following describes steps S316, S318, S340, and S342 with reference to FIG. 11. The other steps are the same as in the process described in FIG. 9, and will not be described.

If the user has a positive emotion (YES in step S306), the processor 110 in step S316 determines whether a positive emotion has been detected at least a first predetermined number of times (step S316). The processor 110 repeats the procedures from step S308 if a positive message has not been detected the first predetermined number of times (NO in step S316).

If a positive message has been consecutively accepted at least the first predetermined number of times (YES in step S316), the processor 110 determines whether the proportion of the positive messages in the messages of both emotions detected during the same time period accounts for at least a first predetermined proportion, for example, at least 70% (step S318). The processor 110 repeats the procedures from step S308 if the proportion of the positive messages in the messages of both emotions is below the first predetermined proportion (NO in step S318).

If the proportion of the positive messages in the messages of both emotions is at least the first predetermined proportion (YES in step S318), the processor 110 sends the sound output device 200 an exit check message, for example, "Are you feeling OK now?" via the communication interface 160 (step S320).

If the user has a positive emotion (YES in step S338), the processor 110 in step S340 determines whether a positive message has been accepted at least a second predetermined number of times (step S340). In the present embodiment, the second predetermined number of times is smaller than the first predetermined number of times. The processor 110 repeats the procedures from step S332 if a positive message has not been accepted at least the second predetermined number of times (NO in step S340).

If a positive message has been accepted at least the second predetermined number of times (YES in step S340), the processor 110 determines whether the proportion of the positive messages in the messages of both emotions detected during the same time period accounts for at least a second predetermined proportion, for example, at least 60% (step S342). The processor 110 repeats the procedures from step S332 if the proportion of the positive messages in the messages of both emotions is below the second predetermined proportion (NO in step S342).

The processor 110 repeats the procedures from step S320 if the proportion of the positive messages in the messages of both emotions is at least the second predetermined proportion (YES in step S342).

As described above, in the present embodiment, a conversation is ended while the user is having a positive feeling, and the user can more pleasantly end a conversation than in related art with the sound output device, the network system, the sound output method, and the sound output program of the embodiment.

In step S316, the processor 110 may determine whether both a positive emotion and a negative emotion have been detected at least a first predetermined number of times. Likewise, in step S340, the processor 110 may determine whether both a positive emotion and a negative emotion have been detected at least a second predetermined number of times.

Fourth Embodiment

In First Embodiment, the process to end a conversation is performed upon a positive emotion being consecutively detected a first predetermined number of times in a user. It is also possible, however, to perform the process to end a conversation under other conditions. For example, a conversation may be ended when a positive emotion detected during a first predetermined time period accounts for at least a first predetermined proportion, as in the present embodiment.

Figure 12:
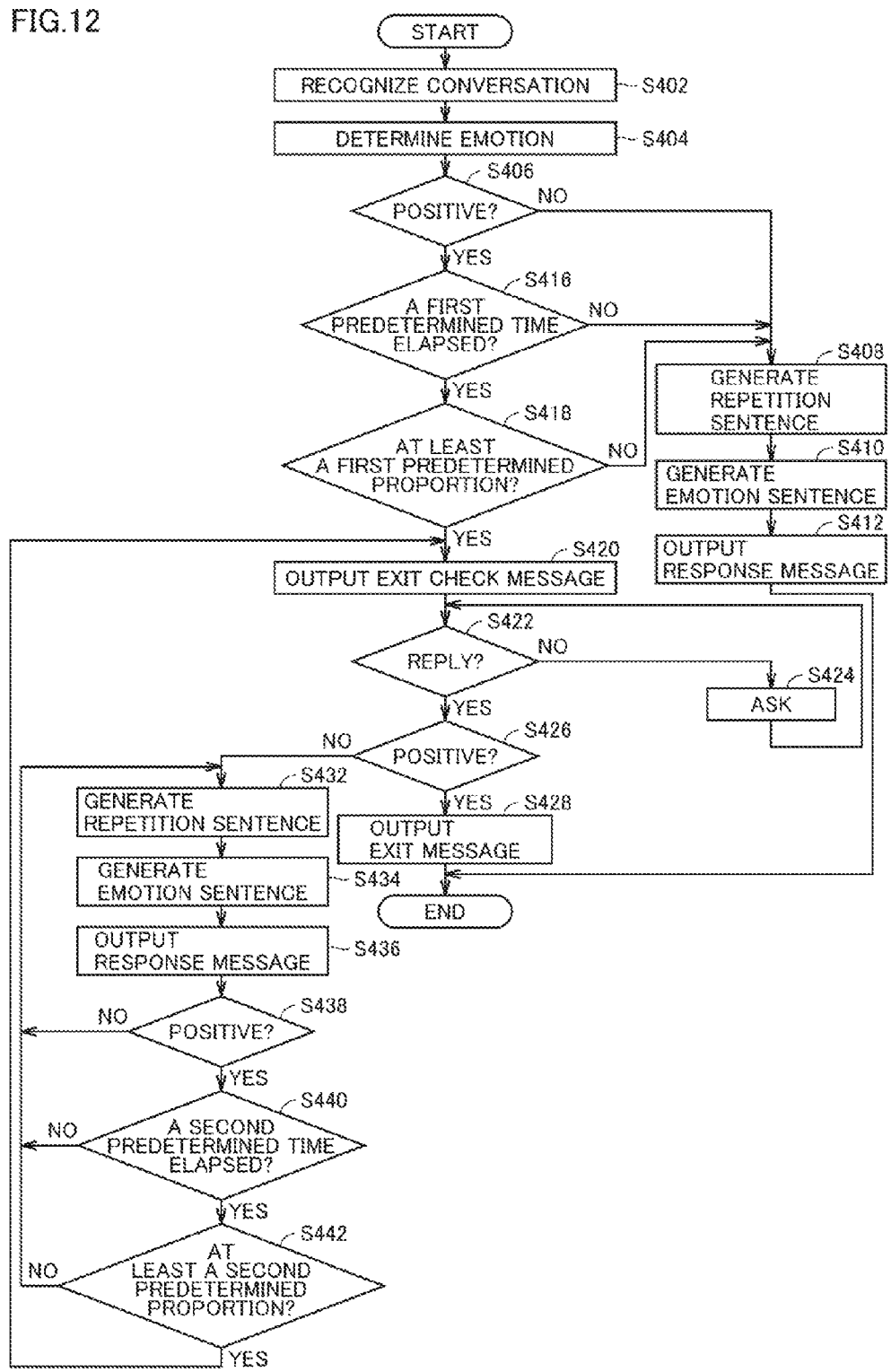
FIG. 12 is a flowchart representing the sound output process of a server 100 according to Fourth Embodiment.

A part of the sound output process of the server 100 according to the present embodiment is described below with reference to FIG. 12. The overall configuration of the network system 1, and the hardware configurations of the server 100 and the sound output device 200 are as described in First Embodiment, and will not be described. FIG. 12 is a flowchart representing the sound output process of the server 100 according to the present embodiment.

<Details of Sound Output Process in Server 100>

The following describes steps S416, S418, S440, and S442 with reference to FIG. 12. The other steps are the same as in the process described in FIG. 9, and will not be described.

First, if the user has a positive emotion (YES in step S406), the processor 110 in step S316 determines whether a positive or a negative emotion has been accepted during at least a first predetermined time period (step S416). The processor 110 repeats the procedures from step S408 if a positive or a negative emotion has not been accepted during at least the first predetermined time period (NO in step S416).

If a positive or a negative message has been accepted during at least the first predetermined time period (YES in step S416), the processor 110 determines whether the proportion of the positive messages in the messages of both emotions detected during the same time period accounts for at least a first predetermined proportion, for example, at least 70% (step S418). The processor 110 repeats the procedures from step S408 if the proportion of the positive messages in the messages of both emotions is below the first predetermined proportion (NO in step S418).

If the proportion of the positive messages in the messages of both emotions is at least the first predetermined proportion (YES in step S418), the processor 110 sends the sound output device 200 an exit check message, for example, "Are you feeling OK now?" via the communication interface 160 (step S420).

If the user has a positive emotion (YES in step S438), the processor 110 in step S440 determines whether a positive or a negative message has been accepted during at least a second predetermined time period (step S440). In the present embodiment, the second predetermined time period is shorter than the first predetermined time period. The processor 110 repeats the procedures from step S432 if a positive message has not been accepted during at least the second predetermined time period (NO in step S440).

If a positive or a negative message has been accepted during at least the second predetermined time period (YES in step S440), the processor 110 determines whether the proportion of positive messages in the messages of both emotions is at least a second predetermined proportion, for example, at least 60% (step S442). The processor 110 repeats the procedures from step S432 if the proportion of the positive messages in the messages of both emotions is below the second predetermined proportion (NO in step S442).

The processor 110 repeats the procedures from step S420 if the proportion of the positive messages in the messages of both emotions is at least the second predetermined proportion (YES in step S442).

As described above, in the present embodiment, a conversation is ended while the user is having a positive feeling, and the user can more pleasantly end a conversation than in related art with the sound output device, the network system, the sound output method, and the sound output program of the embodiment.

Fifth Embodiment

In First to Fourth Embodiments, the sound output device 200 accepts a user's message, and the server 100 creates a return message. However, the sound output device 200 may locally create an answer message by itself.

The present embodiment describes an autonomous vacuum cleaner as an example of the sound output device 200. The sound output device 200, however, is not limited to a vacuum cleaner. Other examples include home appliances such as air conditioners, refrigerators, air purifiers, humidifiers, dehumidifiers, autonomous vacuum cleaners, illuminations, and clocks; AV (audio-visual) devices such as televisions, hard disk recorders, gaming machines, music players, and personal computers; and household equipment such as photovoltaic generators, intercoms, and water heaters. The sound output device 200 is typically installed in homes or offices, but may be installed in other locations such as in stores, event sites, and stations.

<Brief Overview of Operation of Sound Output Device 200>

Figure 13:
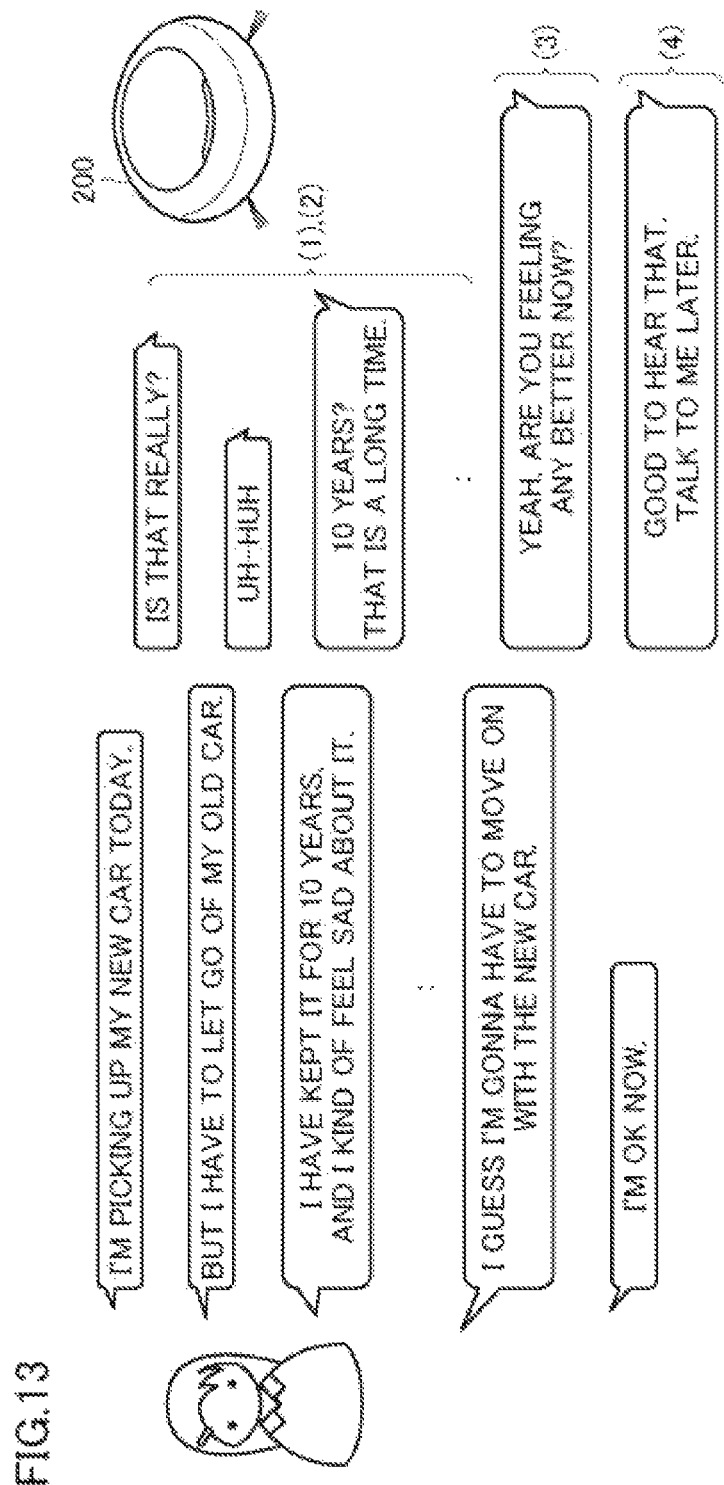
FIG. 13 is a schematic diagram representing a brief overview of the operation of a sound output device 200 according to Fifth Embodiment.

Referring to FIG. 13, a brief overview of the operation of the sound output device 200 according to the present embodiment is described below. FIG. 13 is a schematic diagram representing a brief overview of the operation of the sound output device 200 according to the present embodiment.

The following descriptions will be given through the case where the sound output device 200, upon finding that a user has a negative emotion, guides the user to have a positive emotion in a conversation, and ends the conversation while the user is having a positive emotion. The positive emotions and the negative emotions are as described in FIG. 2, and will not be described.

First, a user talks to the sound output device 200 by saying "I'm picking up my new car today." Here, the user has both a negative emotion and a positive emotion, specifically, the sad feeling that he/she has to let go of his/her longtime car, and the happy feeling that the user is getting a new car ((1) and (2) in FIG. 13).

The sound output device 200 detects positive emotions and negative emotions from information such as the content of the user message, the intonation or accent of the speech sound, and the speaking speed of the user. Upon detecting a negative emotion in the user, the sound output device 200 continues a conversation with the user. On the other hand, upon detecting a positive emotion in the user, the sound output device 200 guides the user to end the conversation while maintaining the positive emotion of the user ((1) and (2) in FIG. 13).

After several exchanges of conversations, the user talks to the sound output device 200 by saying "I guess I'm gonna have to move on with the new car." In response, the sound output device 200 detects a positive mood in the user, specifically a positive feeling ((3) in FIG. 13).

The sound output device 200 outputs a pre-exit message to determine whether to end the conversation. For example, the sound output device 200 asks the user the question "Are you feeling any better now?" ((3) in FIG. 13.)

When the user gives the positive replay "I'm OK", the sound output device 200 outputs a message indicative of a future action of the device, together with a goodbye message. For example, the sound output device 200 ends the conversation with the output message "That is good. I will carry on cleaning the living room. Talk to me later." ((4) in FIG. 13)

The procedure to end a conversation while maintaining the positive emotion of the user when the user has a positive emotion is as described in FIG. 3, and will not be described.

The following specifically describes how such functions are realized in the sound output device 200. The hardware configuration of the sound output device 200 according to the present embodiment is the same as the aspect of the hardware configuration described in FIG. 6, and will not be described.

In the present embodiment, however, the emotion database 121, and other data are stored in the memory 220 of the sound output device 200. Alternatively, the emotion database 121, and other data may be stored in a device different from the sound output device 200. In this case, the processor 210 of the sound output device 200 is adapted to externally refer to the emotion database 121 via the communication interface 260.

The emotion database 121 is as described in FIG. 5, and will not be described.

Preferably, the memory 120 stores a database used to vocally output user's emotions in response to user messages, as in First to Fourth Embodiments. In the database, for example, the message "You are tired" is associated with user messages such as "It was a busy day", or voice intonations characteristic of tiredness. Alternatively, for example, the message "You must be angry" is associated with user messages such as "I clashed with a friend of mine", or rough intonations in user's voice.

<Functional Configuration of Sound Output Device 200>

Figure 14:
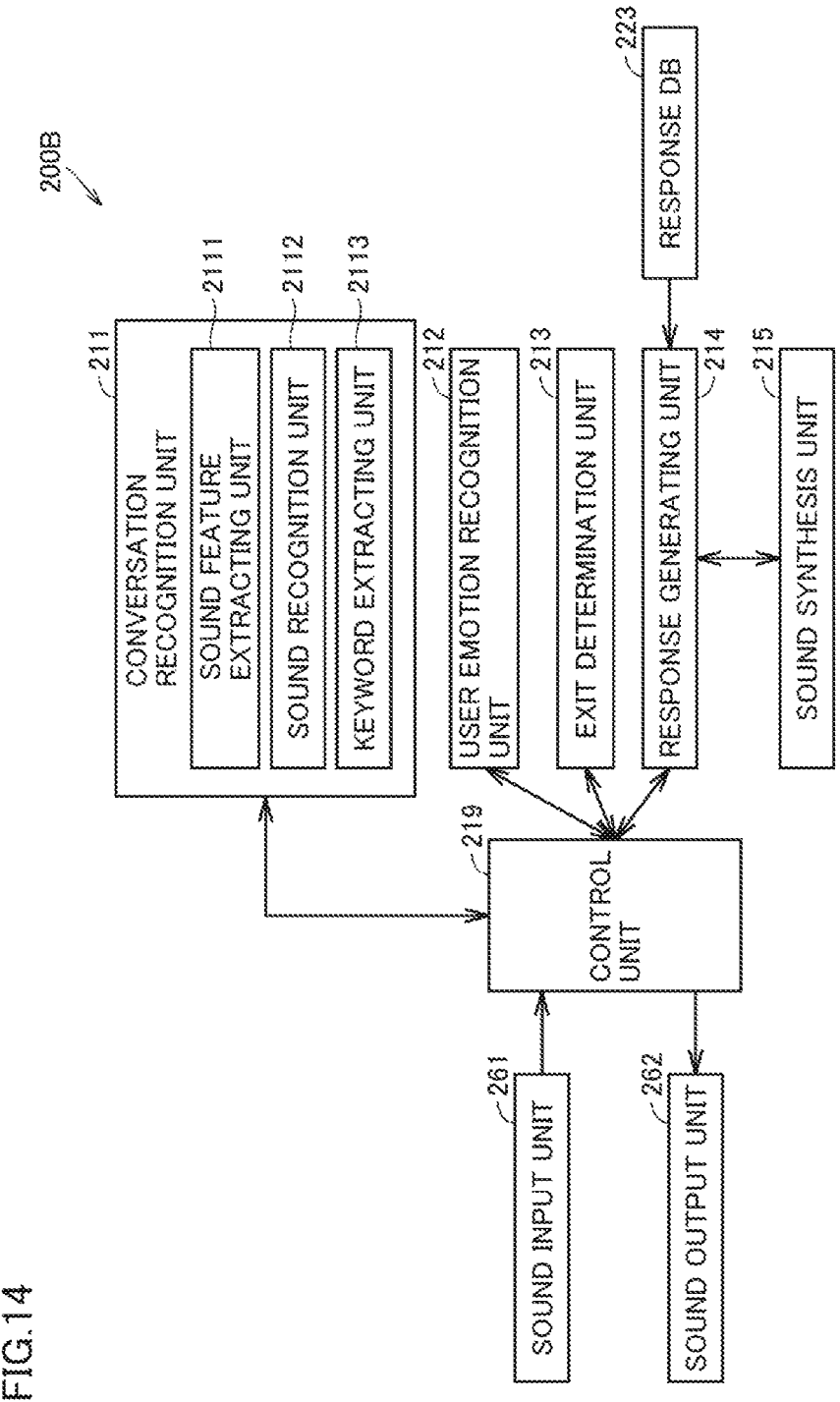
FIG. 14 is a block diagram representing the functional configuration of the sound output device 200 according to Fifth Embodiment.

The functional configuration of the sound output device 200 according to the present embodiment is described below with reference to FIG. 14. FIG. 14 is a block diagram representing the functional configuration of the sound output device 200 according to the present embodiment.

The processor 210 executes programs in the memory 220 to realize a conversation recognition unit 211, a user emotion recognition unit 212, an exit determination unit 213, a response generating unit 214, a sound synthesis unit 215, and a control unit 219.

A sound input unit 261 is realized by the processor 210 controlling the microphone 270 through execution of programs in the memory 220. A sound output unit 262 is realized by the processor 210 controlling the speaker 280 through execution of programs in the memory 220.

First, the sound input unit 261 accepts the sound produced by a user. Specifically, in response to an incoming user message, the sound input unit 261 produces sound data by converting the sound accepted via the microphone 270. The sound input unit 261 then passes the sound data to the control unit 219.

The control unit 219 passes the sound data from the sound input unit 261 to the conversation recognition unit 211.

The conversation recognition unit 211 uses the sound data from the sound output device 200, and converts it into, for example, text data. Specifically, in the present embodiment, the conversation recognition unit 211 includes a sound feature extracting unit 2111, a sound recognition unit 2112, and a keyword extracting unit 2113. The sound feature extracting unit 2111 extracts the characteristic parameters of the sound from the received sound data. The sound recognition unit 2112 creates message text from the extracted parameters. From the text, the keyword extracting unit 2113 extracts keywords.

By using the accepted sound data, the emotion recognition unit 212 determines the current user emotion from the content or intonations of the message.

From the user's emotion, the exit determination unit 213 determines whether to continue the conversation, or send an exit check message, or a message for ending a conversation.

From the result of the exit determination, the response generating unit 214 creates various messages for continuing conversations.

For example, the response generating unit 214 creates a message that repeats the words spoken by the user. By referring to a response DB 223, the response generating unit 214 also creates a message that indicates the user's emotion. The response generating unit 214 combines these messages to create a conversational sentence.

The response generating unit 214 also creates a message for checking whether the user has a positive emotion.

The response generating unit 214 also creates an exit message.

In the present embodiment, the sound synthesis unit 215 creates sound data by using the text-format conversational sentences created by the response generating unit 214.

The control unit 219 passes the created sound data to the sound output unit 262. The sound output unit 262 vocally outputs a message based on the sound data.

<Brief Overview of Sound Output Process in Sound Output Device 200>

Figure 15:
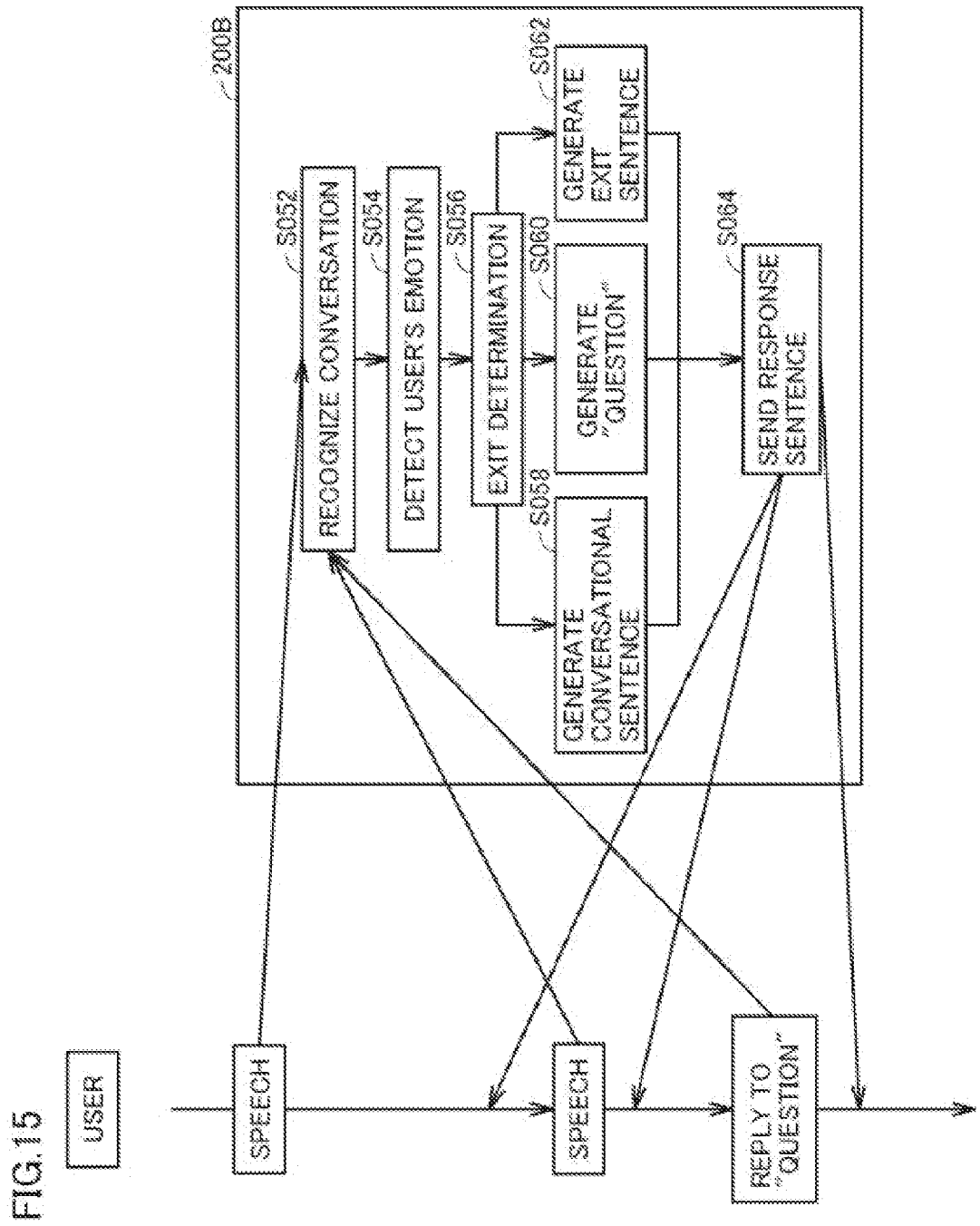
FIG. 15 is a schematic diagram representing the sound output process in the sound output device 200 according to Fifth Embodiment.

The sound output process in the sound output device 200 according to the present embodiment is described below with reference to FIG. 15. FIG. 15 is a schematic diagram representing the sound output process in the sound output device 200 according to the present embodiment.

In response to a user producing a message, the processor 210 obtains sound data via the microphone 270. The processor 210 then executes programs in the memory 220, and recognizes the content of the conversation by using the sound data (step S052).

By using the accepted sound data, the processor 210 determines the current user emotion from the content or intonations of the message (step S054).

From the user's emotion, the processor 210 determines whether to continue the conversation, or send an exit check message, or a message for ending a conversation (step S056).

From the result of the exit determination, the processor 210 creates a message for continuing the conversation (step S058). For example, the processor 210 creates a message that repeats the words spoken by the user, or a message that indicates the user's feeling, and combines these messages to create a conversational sentence. For example, in response to the user saying "It was a rough day", the processor 210 combines the message "You had a rough day", and the message "You sound very tired."

Alternatively, from the result of the exit determination, the processor 210 creates a message for checking whether the user has a positive emotion (step S060). For example, the processor 210 creates the message "Are you feeling any better now?"

Alternatively, from the result of the exit determination, the processor 210 creates an exit message (step S062). For example, the processor 210 creates a message indicative of a future action of the sound output device 200. The processor 210 creates the message "Take care. I'd better start cleaning the living room now."

The processor 210 vocally outputs the created message via the speaker 280 (step S014).

<Details of Sound Output Process in Sound Output Device 200>

The sound output process in the sound output device 200 is no different from the sound output processes described in FIGS. 9 to 12 in First to Fourth Embodiments, and will not be described. Specifically, in the present embodiment, the processor 210 of the sound output device 200 performs the sound output process of FIGS. 9 to 12 upon receiving sound via the microphone 270.

In steps S112, S212, S312, and S412, the processor 210 combines a repetition sentence and an emotion sentence to create a response message, and vocally outputs the response message via the speaker 280 (step S412). The processor 210 then ends the current sound output process.

In steps S120, S220, S320, and S420, the processor 210 vocally outputs an exit check message, for example, "Are you feeling OK now?" via the speaker 280.

In steps S128, S228, S328, and S428, the processor 210 vocally outputs an exit message, for example, "Good to hear that. Take care. I'd better start cleaning the living room now" via the speaker 280.

In this manner, in the present embodiment, a conversation is ended while the user is having a positive feeling, and the user can more pleasantly end a conversation than in related art with the sound output device, the network system, the sound output method, and the sound output program of the embodiment.

Sixth Embodiment

In First to Fifth Embodiments, the emotion database 121 stores four kinds of emotions, joy, anger, sadness, and delight, and keywords associated with these emotions. However, the emotion database may store different combinations.

For example, as shown in FIG. 16, the emotion database 122 may store four kinds of emotions, anger, sadness, anxiety, and joy, and keywords associated with these emotions. In this case, a user is determined as having a positive emotion upon acceptance of keywords associated with joy, and a negative emotion upon acceptance of keywords associated with anger, sadness, and anxiety.

The emotion database may store five or more kinds of emotions, and keywords associated therewith.

Seventh Embodiment

In First Embodiment, the process to end a conversation is performed upon detecting a positive emotion in a user. However, a conversation may be ended upon no longer detecting a negative emotion in a user. The following describes a part of the functional configuration and the sound output process of the server 100 according to the present embodiment. The overall configuration of the network system 1, and the hardware configurations of the server 100 and the sound output device 200 are the same as in First Embodiment, and will not be described.

As shown in FIG. 7, the response generating unit 114 creates a message for checking whether a user still has a negative emotion. For example, the response generating unit 114 outputs the message "Are you feeling OK now?" upon detecting non-negative emotions more than once.

The response generating unit 114 also creates an exit message. For example, the response generating unit 114 outputs the message "Good to hear that. It was fun talking with you. I will carry on cleaning the living room. Talk to me later."

Figure 17:
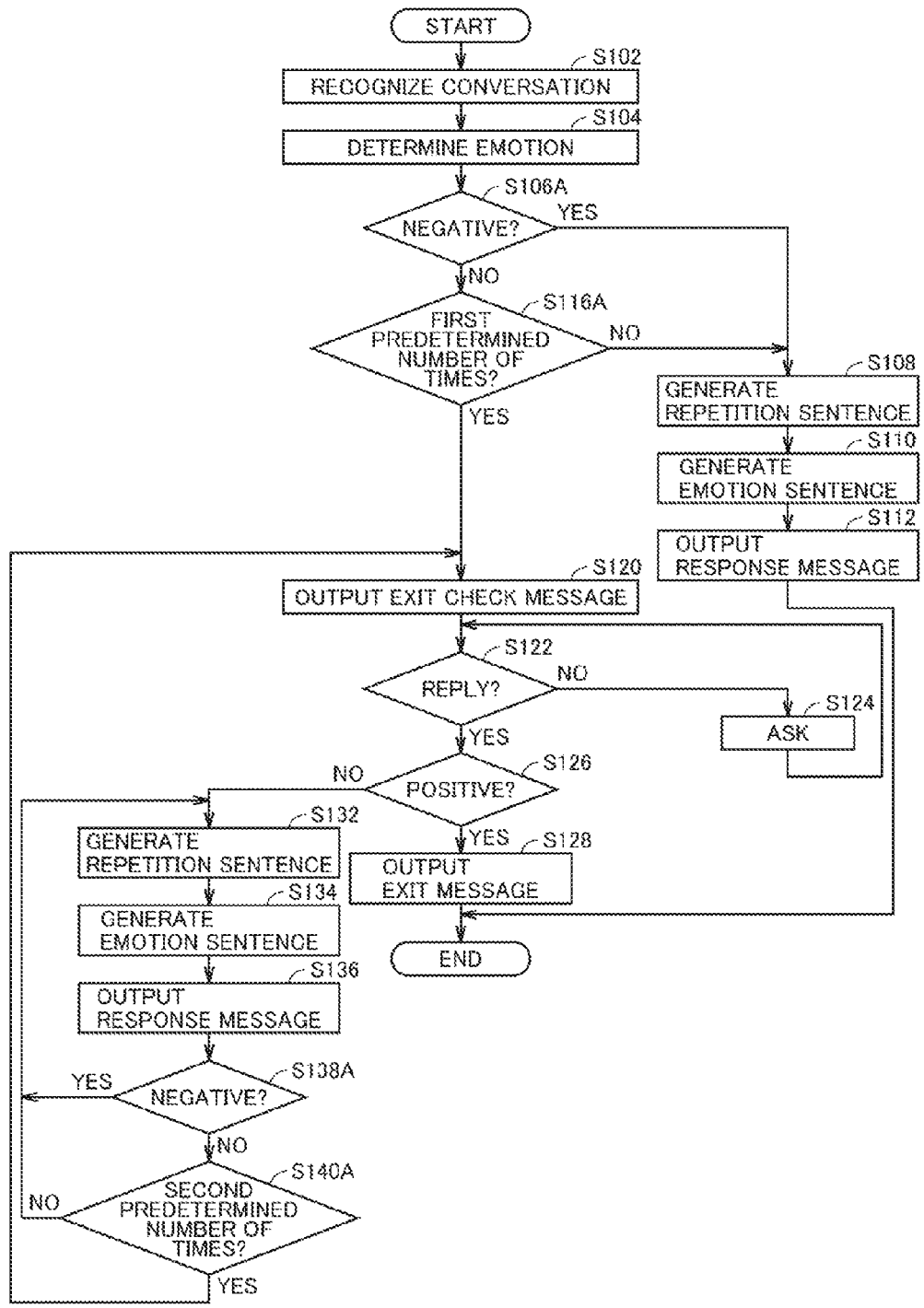
FIG. 17 is a schematic diagram representing the sound output process in a sound output device 200 according to Seventh Embodiment.

A part of the sound output process of the server 100 according to the present embodiment is described below with reference to FIG. 17. FIG. 17 is a flowchart representing the sound output process of the server 100 according to the present embodiment.

In step S106A, the processor 110 determines whether a user has a negative emotion. If the user has a negative emotion (YES in step S106A), the processor 110 generates a repetition sentence that repeats the words of the user (step S108).

By using the user's emotion so determined, the processor 110 generates an emotion sentence to vocally output the user's emotion (step S110). The processor 110 combines the repetition sentence and the emotion sentence to create a response message, and sends the response message to the sound output device 200 via the communication interface 160 (step S112). The processor 110 then ends the current sound output process.

On the other hand, if the user does not have a negative emotion (NO in step S106A), the processor 110 determines whether a non-negative message has been consecutively accepted a first predetermined number of times (step S116A). The processor 110 repeats the procedures from step S108 if a non-negative message has not been consecutively accepted the first predetermined number of times (NO in step S116A).

If a non-negative message has been consecutively accepted the first predetermined number of times (YES in step S116A), the processor 110 sends the sound output device 200 an exit check message, for example, "Are you feeling OK now?" via the communication interface 160 (step S120).

In step S138A, the processor 110 determines whether the user has a negative emotion. If the user has a negative emotion (YES in step S138A), the processor 110 repeats the procedures from step S132.

On the other hand, if the user does not have a negative emotion (NO in step S138A), the processor 110 determines whether a non-negative message has been accepted a second predetermined number of times (step S140A). In the present embodiment, the second predetermined number of times is smaller than the first predetermined number of times. The processor 110 repeats the procedures from step S132 if a negative message has been accepted even once (NO in step S140A).

The processor 110 repeats the procedures from step S120 if a negative message has not been accepted the second predetermined number of times (YES in step S140A).

In this manner, in the present embodiment, a conversation is ended while the user is not having a negative feeling, and the user can more pleasantly end a conversation than in related art with the sound output device, the network system, the sound output method, and the sound output program of the embodiment.

Eighth Embodiment

In Seventh Embodiment, the process to end a conversation is performed upon a non-negative emotion being consecutively detected a first predetermined number of times in a user. It is also possible, however, to perform the process to end a conversation under other conditions. For example, a conversation may be ended when a non-negative emotion is sustained during a first predetermined time period, as in the present embodiment.

Figure 18:
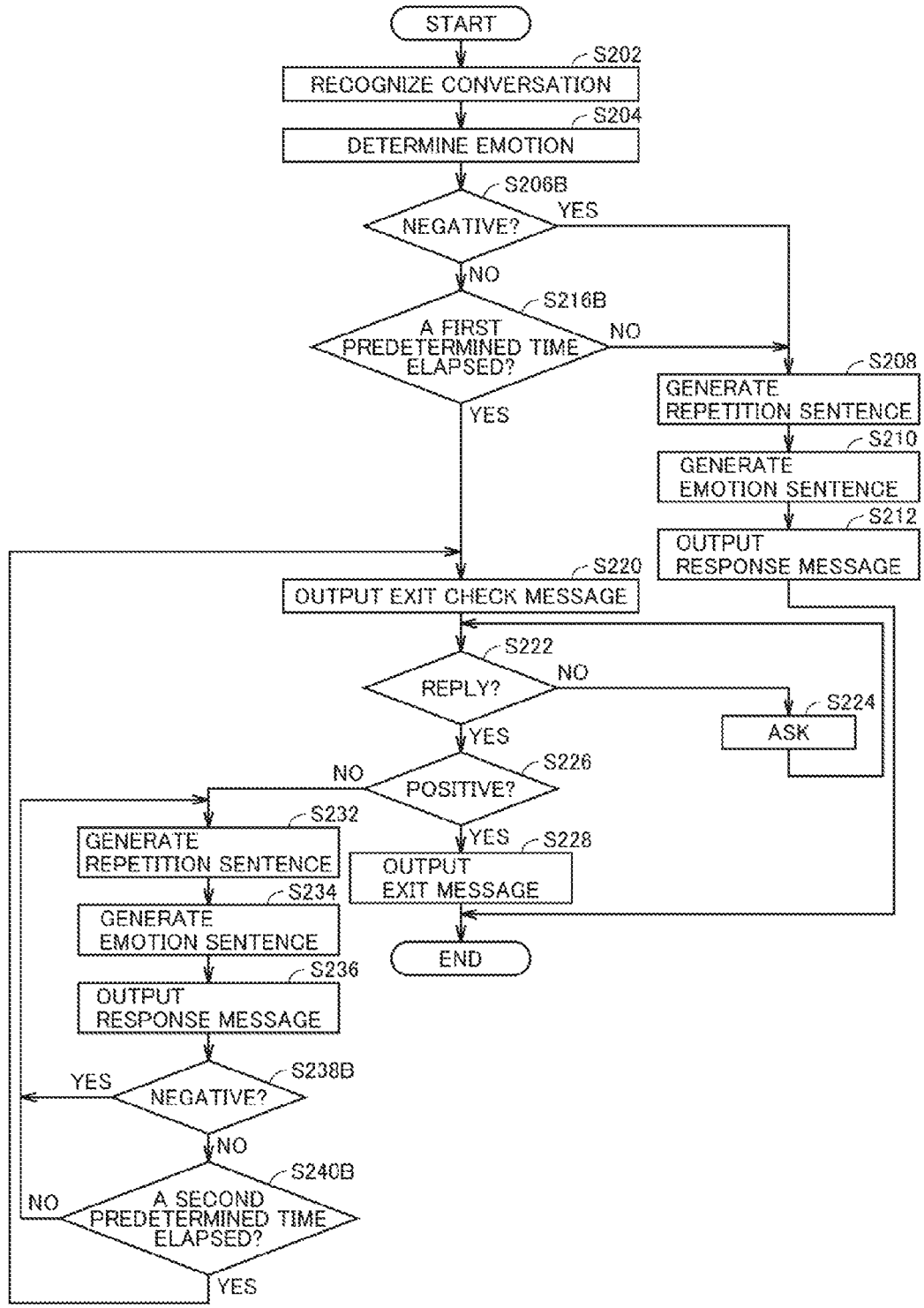
FIG. 18 is a schematic diagram representing the sound output process in a sound output device 200 according to Eighth Embodiment.

A part of the sound output process of the server 100 according to the present embodiment is described below with reference to FIG. 18. The overall configuration of the network system 1, and the hardware configurations of the server 100 and the sound output device 200 are as described in First Embodiment, and will not be described. FIG. 18 is a flowchart representing the sound output process of the server 100 according to the present embodiment.

First, if the user has a non-negative emotion (NO in step S206B), the processor 110 determines whether a non-negative message has been solely accepted during a first predetermined time period (step S216B). The processor 110 repeats the procedures from step S208 if a negative message has been accepted even once (NO in step S216B).

If a negative message has not been accepted during the first predetermined time period (YES in step S216B), the processor 110 sends the sound output device 200 an exit check message, for example, "Are you feeling OK now?" via the communication interface 160 (step S220).

If the user does not have a negative emotion (NO in step S238B), the processor 110 determines whether a non-negative message has been solely accepted during a second predetermined time period (step S240B). In the present embodiment, the second predetermined time period is shorter than the first predetermined time period. The processor 110 repeats the procedures from step S232 if a negative message has been accepted even once (NO in step S240B).

The processor 110 repeats the procedures from step S220 if a negative message has not been accepted during the second predetermined time period (YES in step S240B).

As described above, in the present embodiment, a conversation is ended while the user is not having a negative feeling, and the user can more pleasantly end a conversation than in related art with the sound output device, the network system, the sound output method, and the sound output program of the embodiment.

Ninth Embodiment

In Seventh Embodiment, the process to end a conversation is performed upon a non-negative emotion being consecutively detected a first predetermined number of times in a user. It is also possible, however, to perform the process to end a conversation under other conditions. For example, a conversation may be ended when a negative emotion detected a first predetermined number of times accounts for less than a first predetermined proportion, as in the present embodiment.

Figure 19:
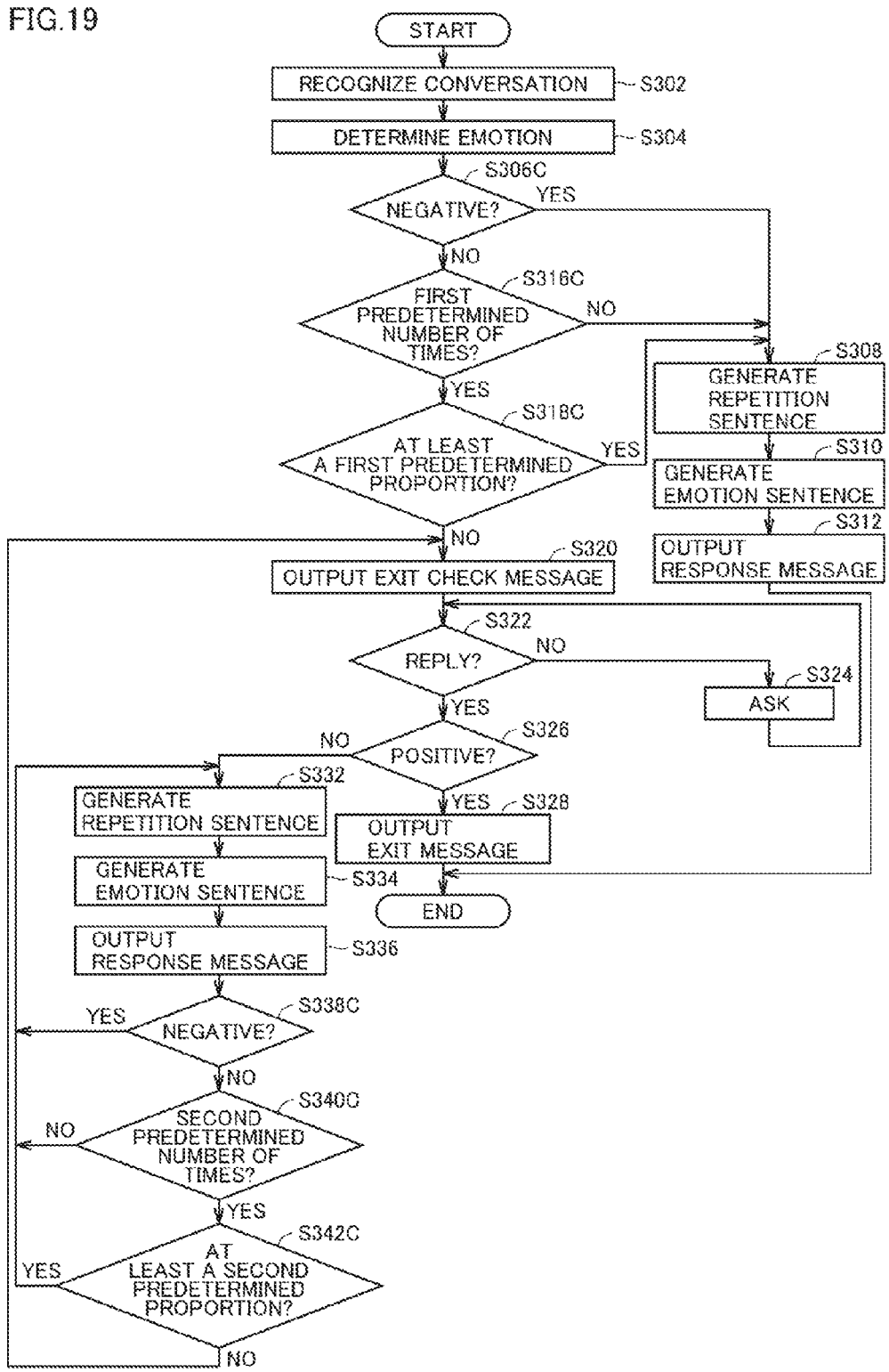
FIG. 19 is a schematic diagram representing the sound output process in a sound output device 200 according to Ninth Embodiment.

A part of the sound output process of the server 100 according to the present embodiment is described below with reference to FIG. 19. The overall configuration of the network system 1, and the hardware configurations of the server 100 and the sound output device 200 are as described in Seventh Embodiment, and will not be described. FIG. 19 is a flowchart representing the sound output process of the server 100 according to the present embodiment.

First, if the user does not have a negative emotion (NO in step S306C), the processor 110 determines whether a message has been detected at least a first predetermined number of times (step S316C). The processor 110 repeats the procedures from step S308 if a message has not been accepted the first predetermined number of times (NO in step S316C).

If a message has been accepted at least the first predetermined number of times (YES in step S316C), the processor 110 determines whether the proportion of negative messages in the messages of both emotions detected during the same time period accounts for at least a first predetermined proportion, for example, at least 30% (step S318C). The processor 110 repeats the procedures from step S308 if the proportion of negative messages in the messages of both emotions is at least the first predetermined proportion (YES in step S318C).

If the proportion of negative messages in the messages of both emotions is below the first predetermined proportion (NO in step S318), the processor 110 sends the sound output device 200 an exit check message, for example, "Are you feeling OK now?" via the communication interface 160 (step S320).

If the user does not have a negative emotion (NO in step S338C), the processor 110 determines whether a message has been accepted at least a second predetermined number of times (step S340C). In the present embodiment, the second predetermined number of times is smaller than the first predetermined number of times. The processor 110 repeats the procedures from step S332 if a message has not been accepted at least the second predetermined number of times (NO in step S340C).

If a message has been accepted at least the second predetermined number of times (YES in step S340C), the processor 110 determines whether the proportion of negative messages in the messages of both emotions detected during the same time period is at least a second predetermined proportion, for example, at least 40% (step S342C). The processor 110 repeats the procedures from step S332 if the proportion of negative messages in the messages of both emotions is at least the second predetermined proportion (YES in step S342C).

The processor 110 repeats the procedures from step S320 if the proportion of negative messages in the messages of both emotions is below the second predetermined proportion (NO in step S342C).

As described above, in the present embodiment, a conversation is ended while the user is not having a negative feeling, and the user can more pleasantly end a conversation than in related art with the sound output device, the network system, the sound output method, and the sound output program of the embodiment.

In step S316C, the processor 110 may determine whether a positive emotion or a negative emotion has been detected at least a first predetermined number of times. Likewise, in step S340C, the processor 110 may determine whether a positive emotion or a negative emotion has been detected at least a second predetermined number of times.

Tenth Embodiment

In Seventh Embodiment, the process to end a conversation is performed upon a non-negative emotion being consecutively detected a first predetermined number of times in a user. It is also possible, however, to perform the process to end a conversation under other conditions. For example, a conversation may be ended when a negative emotion detected during a first predetermined time period accounts for less than a first predetermined proportion, as in the present embodiment.

A part of the sound output process of the server 100 according to the present embodiment is described below with reference to FIG. 20. The overall configuration of the network system 1, and the hardware configurations of the server 100 and the sound output device 200 are as described in First Embodiment, and will not be described. FIG. 20 is a flowchart representing the sound output process of the server 100 according to the present embodiment.

First, if the user has a non-negative emotion (NO in step S406D), the processor 110 determines whether a positive or a negative emotion message has been accepted during at least a first predetermined time period (step S416D). The processor 110 repeats the procedures from step S408 if a positive or a negative message has not been accepted during the first predetermined time period (NO in step S416D).

If a positive or a negative message has been accepted during at least the first predetermined time period (YES in step S416D), the processor 110 determines whether the proportion of negative messages in the messages of both emotions detected during the same time period accounts for at least a first predetermined proportion, for example, at least 30% (step S418D). The processor 110 repeats the procedures from step S408 if the proportion of negative messages in the messages of both emotions is at least the first predetermined proportion (YES in step S418D).

If the proportion of negative messages in the messages of both emotions is below the first predetermined proportion (NO in step S418D), the processor 110 sends the sound output device 200 an exit check message, for example, "Are you feeling OK now?" via the communication interface 160 (step S420).

If the user does not have a negative emotion (NO in step S438D), the processor 110 determines whether a positive or a negative message has been accepted during at least a second predetermined time period (step S440D). In the present embodiment, the second predetermined time period is shorter than the first predetermined time period. The processor 110 repeats the procedures from step S432 if a message has not been accepted during at least the second predetermined time period (NO in step S440D).

If a positive or a negative message has been accepted during at least the second predetermined time period (YES in step S440D), the processor 110 determines whether the proportion of negative messages in the messages of both emotions is at least a second predetermined proportion, for example, at least 40% (step S442D). The processor 110 repeats the procedures from step S432 if the proportion of negative messages in the messages of both emotions is at least the second predetermined proportion (YES in step S442D).

The processor 110 repeats the procedures from step S420 if the proportion of negative messages in the messages of both emotions is below the second predetermined proportion (NO in step S442D).

As described above, in the present embodiment, a conversation is ended while the user is not having a negative feeling, and the user can more pleasantly end a conversation than in related art with the sound output device, the network system, the sound output method, and the sound output program of the embodiment.

Eleventh Embodiment

In Seventh to Tenth Embodiments, the sound output device 200 accepts a user message, and the server 100 creates a return message. However, the sound output device 200 may locally create an answer message by itself. The present embodiment has relevance to Seventh to Tenth Embodiments in the same way Fifth Embodiment is relevant to First to Fourth Embodiments. Accordingly, the present embodiment will not be described in this regard.

Twelfth Embodiment

In Seventh to Eleventh Embodiments, the emotion database 121 stores four kinds of emotions, joy, anger, sadness, and delight, and keywords associated with these emotions. However, the emotion database may store different combinations. The present embodiment has relevance to Seventh to Eleventh Embodiments in the same way Sixth Embodiment is relevant to First to Fifth Embodiments. Accordingly, the present embodiment will not be described in this regard.

Examples of Other Applications

As is evident, the present invention also can be achieved by supplying a program to a system or a device. The advantages of the present invention also can be obtained with a computer (or a CPU or an MPU) in a system or a device upon the computer reading and executing the program code stored in the supplied storage medium (or memory) storing software programs intended to realize the present invention.

In this case, the program code itself read from the storage medium realizes the functions of the embodiments above, and the storage medium storing the program code constitutes the present invention.

Evidently, the functions of the embodiments above can be realized not only by a computer reading and executing such program code, but by some or all of the actual processes performed by the OS (operating system) or the like running on a computer under the instructions of the program code.

The functions of the embodiments above also can be realized by some or all of the actual processes performed by the CPU or the like of an expansion board or expansion unit under the instructions of the program code read from a storage medium and written into other storage medium provided in the expansion board inserted into a computer or the expansion unit connected to a computer.

The configurations of the embodiments above may be combined across the embodiments, or may be used in part or partly omitted.

Embodiment Summary

In First to Twelfth Embodiments, a conversation is ended upon the server or the terminal determining that a user has a positive emotion. Alternatively, a conversation is ended upon the server or the terminal determining that a user is not having a negative emotion.

Specifically, in First to Sixth Embodiments, the sound output device 200 is provided that includes the microphone 270, the speaker 280, and the processor 210. The processor 210 performs the process to end a conversation either directly or indirectly when the message accepted via the microphone 270 corresponds to a first emotion, and continues a conversation via the speaker 280 when the message accepted via the microphone 270 does not correspond to the first emotion.

In First to Sixth Embodiments, the processor 210 outputs a predetermined message through the speaker 280 when the accepted message corresponds to a first emotion, and ends a conversation when the answer to the predetermined message corresponds to the first emotion, and continues a conversation through the speaker 280 when the answer to the predetermined message does not correspond to the first emotion.

In First, Fifth, and Sixth Embodiments, the processor 210 ends a conversation when the plurality of messages accepted via the microphone 270 corresponds to a first emotion, and continues a conversation through the speaker 280 when the plurality of messages accepted via the microphone 270 does not correspond to the first emotion.

In Second, Fifth, and Sixth Embodiments, the processor 210 ends a conversation when at least one message accepted via the microphone 270 during a predetermined time period corresponds to a first emotion, and continues a conversation via the speaker 280 when at least one message accepted via the microphone 270 during a predetermined time period does not correspond to the first emotion.

In Third, Fifth, and Sixth Embodiments, the processor 210 ends a conversation when at least a predetermined proportion of the messages accepted a predetermined number of times via the microphone 270 corresponds to a first emotion, and continues a conversation via the speaker 280 when at least a predetermined proportion of the messages accepted a predetermined number of times via the microphone 270 does not correspond to the first emotion.

In Fourth, Fifth, and Sixth Embodiments, the processor 210 ends a conversation when at least a predetermined proportion of at least one message accepted via the microphone 270 during a predetermined time period corresponds to a first emotion, and continues a conversation via the speaker 280 when at least a predetermined proportion of at least one message accepted via the microphone 270 during a predetermined time period does not correspond to the first emotion.

In First to Sixth Embodiments, the processor 210 makes the speaker 280 output a message that conforms to the message input through the microphone 270.

In First to Sixth Embodiments, the processor 210 makes the speaker 280 output a message that has substantially the same meaning as the message accepted via the microphone 270.

In First to Sixth Embodiments, the processor 210 makes the speaker 280 output words that express an emotion corresponding to the message accepted via the microphone 270.

In First to Sixth Embodiments, the processor 210 in ending a conversation makes the speaker 280 output a message that indicates an upcoming action of the sound output device 200.

In First, Second, Third, Fourth, and Sixth Embodiments, the sound output device 200 further includes the communication interface 260 for communicating with the server 100. The processor 210 from the server 100 via the communication interface 260 receives a message to be output from the speaker 280.

In First to Sixth Embodiments, the sound output method is provided for the sound output device 200 that includes the microphone 270, the speaker 280, and the processor 210. The sound output method includes the processor 210 ending a conversation when the message accepted via the microphone 270 corresponds to a first emotion, and the processor 210 continuing a conversation via the speaker 280 when the message accepted via the microphone 270 does not correspond to the first emotion.

In First to Sixth Embodiments, the sound output program is provided for the sound output device 200 that includes the microphone 270, the speaker 280, and the processor 210. The sound output program causes the processor 210 to perform ending a conversation when the message accepted via the microphone 270 corresponds to a first emotion, and continuing a conversation via the speaker 280 when the message accepted via the microphone 270 does not correspond to the first emotion.

In First to Sixth Embodiments, the network system 1 is provided that includes the sound output device 200, and the server 100 that communicates with the sound output device 200. The server 100 causes the sound output device 200 to end a conversation when the message accepted by the sound output device 200 corresponds to a first emotion, and continue a conversation when the message accepted by the sound output device 200 does not correspond to the first emotion.

In First to Sixth Embodiments, the sound output method is provided for the network system 1 that includes the sound output device 200, and the server 100 adapted to communicate with the sound output device 200. The sound output method includes the sound output device 200 accepting a message, the server 100 determining whether the message corresponds to a first emotion, the server 100 causing the sound output device 200 to end a conversation when the message corresponds to the first emotion, and the server 100 causing the sound output device 200 to continue a conversation when the message does not correspond to the first emotion.

In First to Sixth Embodiments, the server 100 is provided that includes the communication interface 160 for communicating with the sound output device 200, and the processor 110. The processor 110 receives a message from the sound output device 200 via the communication interface 160. The processor via the communication interface 160 causes the sound output device 200 to end a conversation when the message corresponds to a first emotion, and to continue a conversation when the message does not correspond to the first emotion.

In First to Sixth Embodiments, the sound output method is provided for the server 100 that includes the communication interface 160 for communicating with the sound output device 200, and the processor 110. The sound output method includes the processor 110 receiving a message from the sound output device 200 via the communication interface 160, the processor 110 determining whether the message corresponds to a first emotion, the processor 110 via the communication interface 160 causing the sound output device 200 to end a conversation when the message corresponds to the first emotion, and the processor 110 via the communication interface 160 causing the sound output device 200 to continue a conversation when the message does not correspond to the first emotion.

In First to Sixth Embodiments, the sound output program is provided for the server 100 that includes the communication interface 160 for communicating with the sound output device 200, and the processor 110. The sound output program causes the processor 110 to perform receiving a message from the sound output device 200 via the communication interface 160, determining whether the message corresponds to a first emotion, causing the sound output device 200 to end a conversation via the communication interface 160 when the message corresponds to the first emotion, and causing the sound output device 200 to continue a conversation via the communication interface 160 when the message does not correspond to the first emotion.

In Seventh to Twelfth Embodiments, the sound output device 200 is provided that includes the microphone 270, the speaker 280, and the processor 210. The processor 210 continues a conversation when the message accepted via the microphone 270 corresponds to a second emotion, and ends a conversation when the message accepted via the microphone 270 does not correspond to the second emotion.

In Seventh to Twelfth Embodiments, the sound output method is provided for the sound output device 200 that includes the microphone 270, the speaker 280, and the processor 210. The sound output method includes the processor 210 performing a process to continue a conversation when the message accepted via the microphone 270 corresponds to a second emotion, and the processor 210 performing a process to end a conversation when the message accepted via the microphone 270 does not correspond to the second emotion.

In Seventh to Twelfth Embodiments, the sound output program is provided for the sound output device 200 that includes the microphone 270, the speaker 280, and the processor 210. The sound output program causes the processor 210 to perform the process to continue a conversation via the speaker 280 when the message accepted via the microphone 270 corresponds to a second emotion, and perform the process to end a conversation when the message accepted via the microphone 270 does not correspond to the second emotion.

In Seventh to Twelfth Embodiments, the network system 1 is provided that includes the sound output device 200, and the server 100 that communicates with the sound output device 200. The server 100 causes the sound output device 200 to continue a conversation when the message accepted by the sound output device 200 corresponds to a second emotion, and causes the sound output device 200 to end a conversation when the message accepted by the sound output device 200 does not correspond to the second emotion.

In Seventh to Twelfth Embodiments, the sound output method is provided for the network system that includes the sound output device 200, and the server 100 adapted to communicate with the sound output device 200. The sound output method includes the sound output device 200 accepting a message, the server 100 determining whether the message corresponds to a second emotion, the server 100 causing the sound output device 200 to continue a conversation when the message corresponds to the second emotion, and the server 100 causing the sound output device 200 to end a conversation when the message does not correspond to the second emotion.

In Seventh to Twelfth Embodiments, the server 100 is provided that includes the communication interface 160 for communicating with the sound output device 200, and the processor 110. The processor 110 receives a message from the sound output device 200 via the communication interface 160. The processor 110 via the communication interface 160 causes the sound output device 200 to continue a conversation when the message corresponds to a second emotion, and to end a conversation when the message does not correspond to the second emotion.

In Seventh to Twelfth Embodiments, the sound output method is provided for the server 100 that includes the communication interface 160 for communicating with the sound output device 200, and the processor 110. The sound output method includes the processor 110 receiving a message from the sound output device 200 via the communication interface 160, the processor 110 determining whether the message corresponds to a second emotion, the processor 110 via the communication interface 160 causing the sound output device 200 to continue a conversation when the message corresponds to the second emotion, and the processor 110 via the communication interface 160 causing the sound output device 200 to end a conversation when the message does not correspond to the second emotion.

In Seventh to Twelfth Embodiments, the sound output program is provided for the server 100 that includes the communication interface 160 for communicating with the sound output device 200, and the processor 110. The sound output program causes the processor 110 to perform receiving a message from the sound output device 200 via the communication interface 160, determining whether the message corresponds to a second emotion, causing the sound output device 200 to continue a conversation via the communication interface 160 when the message corresponds to the second emotion, and causing the sound output device 200 to end a conversation via the communication interface 160 when the message does not correspond to the second emotion.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the claims set forth below.

What is claimed is:

1. A sound output device comprising:
   a microphone;
   a speaker; and
   a processor,
   wherein the processor is configured to continue a conversation with a user via the speaker when a message accepted via the microphone does not correspond to a first emotion, and to end a conversation with a user when a message accepted via the microphone corresponds to the first emotion; and
   wherein the processor is configured to execute the following acts:
      determining that the message does not correspond to the first emotion;
      generating a conversational output message comprising a repetition sentence and an emotion sentence;
      before ending the conversation, generating a check exit message and receiving a positive return message from the user.

2. The sound output device according to claim 1,
   wherein the first emotion includes at least one of relief, content, curiosity, eagerness, happiness, affection, and respect, and
   wherein the processor is configured to determine that the message corresponds to the first emotion when the message contains a word that corresponds to at least one of relief, content, curiosity, eagerness, happiness, affection, and respect.

3. The sound output device according to claim 1,
   wherein the processor is configured to continue a conversation via the speaker when any of a plurality of messages accepted a plurality of times via the microphone does not correspond to the first emotion, and
   wherein the processor is configured to end a conversation when a plurality of messages accepted a plurality of times via the microphone corresponds to the first emotion.

4. The sound output device according to claim 1,
   wherein the processor is configured to continue a conversation via the speaker when at least one message accepted via the microphone during a predetermined time period does not correspond to the first emotion, and
   wherein the processor is configured to end a conversation when at least one message accepted via the microphone during the predetermined time period corresponds to the first emotion.

5. The sound output device according to claim 1,
   wherein the processor is configured to continue a conversation via the speaker when at least a predetermined proportion of messages accepted a predetermined number of times via the microphone does not correspond to the first emotion, and
   wherein the processor is configured to end a conversation when at least a predetermined proportion of messages accepted the predetermined number of times via the microphone corresponds to the first emotion.

6. The sound output device according to claim 1,
   wherein the processor is configured to continue a conversation via the speaker when at least a predetermined proportion of at least one message accepted via the microphone during a predetermined time period does not correspond to the first emotion, and
   wherein the processor is configured to end a conversation when at least a predetermined proportion of at least one message accepted via the microphone during a predetermined time period corresponds to the first emotion.

7. The sound output device according to claim 1,
   wherein the processor is configured to make the speaker output a message that agrees with the message input through the microphone.

8. The sound output device according to claim 1,
   wherein the processor is configured to make the speaker output a message that has substantially the same meaning as the message accepted via the microphone.

9. The sound output device according to claim 1,
   wherein the processor is configured to make the speaker output a word that expresses an emotion corresponding to the message accepted via the microphone.

10. The sound output device according to claim 1,
    wherein the processor in ending a conversation is configured to make the speaker output a message that indicates an upcoming action of the sound output device.

11. The sound output device according to claim 1, further comprising a communication interface for communicating with a server,
    wherein the processor received from the server via the communication interface a message to be output from the speaker.

12. A network system comprising:
    a sound output device that includes a microphone, a speaker, a first processor, and a first communication interface; and
    a server that includes a second processor, and a second communication interface for communicating with the sound output device,
    wherein the first processor is configured to send the server a message accepted via the speaker, the message being sent via the first communication interface, and wherein the second processor is configured to send data for continuing a conversation with a user to the sound output device via the second communication interface when the message received does not correspond to a first emotion, and to send data for ending a conversation with a user to the sound output device when the message received corresponds to the first emotion; and wherein the processor is configured to execute the following acts:
  determining that the message does not correspond to the first emotion;
  generating a conversational output message comprising a repetition sentence and an emotion sentence;
  before ending the conversation, generating a check exit message and receiving a positive return message from the user.

13. A server comprising:
a communication interface for communicating with a sound output device; and
a processor,
wherein the processor is configured to receive a message from the sound output device via the communication interface, and
wherein the processor is configured to cause via the communication interface the sound output device to continue a conversation with a user when the message does not correspond to a first emotion, and to end a conversation with a user when the message corresponds to the first emotion; and
wherein the processor is configured to execute the following acts:
  determining that the message does not correspond to the first emotion;
  generating a conversational output message comprising a repetition sentence and an emotion sentence;
  before ending the conversation, generating a check exit message and receiving a positive return message from the user.

14. A sound output device comprising:
a microphone;
a speaker; and
a processor,
wherein the processor is configured to continue a conversation with a user via the speaker when a message accepted via the microphone corresponds to a second emotion, and
wherein the processor is configured to end a conversation with a user when a message accepted via the microphone does not correspond to the second emotion; and
wherein the processor is configured to execute the following acts:
  determining that the message corresponds to the second emotion;
  generating a conversational output message comprising a repetition sentence and an emotion sentence;
  before ending the conversation, generating a check exit message and receiving a positive return message from the user.

15. A network system comprising:
a sound output device that includes a microphone, a speaker, a first processor, and a first communication interface; and
a server that includes a second processor, and a second communication interface for communicating with the sound output device,
wherein the first processor is configured to send the server a message accepted via the speaker, the message being sent via the first communication interface, and
wherein the second processor is configured to send data for continuing a conversation with a user to the sound output device when the message received corresponds to a second emotion, and to send data for ending a conversation with a user to the sound output device when the message received does not correspond to the second emotion; and
wherein the processor is configured to execute the following acts:
  determining that the message corresponds to the second emotion;
  generating a conversational output message comprising a repetition sentence and an emotion sentence;
  before ending the conversation, generating a check exit message and receiving a positive return message from the user.

16. A server comprising:
a communication interface for communicating with a sound output device; and
a processor,
wherein the processor is configured to receive a message from the sound output device via the communication interface, and
wherein the processor via the communication interface is configured to cause the sound output device to continue a conversation with a user when the message corresponds to a second emotion, and to end a conversation with a user when the message does not correspond to the second emotion; and
wherein the processor is configured to execute the following acts:
  determining that the message corresponds to the second emotion;
  generating a conversational output message comprising a repetition sentence and an emotion sentence;
  before ending the conversation, generating a check exit message and receiving a positive return message from the user.

* * * * *